United States Patent
Brady et al.

(10) Patent No.: US 7,463,179 B2
(45) Date of Patent: Dec. 9, 2008

(54) COMPRESSIVE SAMPLING AND SIGNAL INFERENCE

(75) Inventors: David J. Brady, Durham, NC (US);
Nikos Pitsianis, Durham, NC (US);
Xiaobai Sun, Durham, NC (US);
Prasant Potuluri, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 11/831,855

(22) Filed: Jul. 31, 2007

(65) Prior Publication Data

US 2008/0074292 A1    Mar. 27, 2008

Related U.S. Application Data

(62) Division of application No. 11/183,838, filed on Jul. 19, 2005, now Pat. No. 7,283,231.

(60) Provisional application No. 60/589,475, filed on Jul. 20, 2004, provisional application No. 60/589,530, filed on Jul. 20, 2004, provisional application No. 60/622,181, filed on Oct. 26, 2004.

(51) Int. Cl.
*H03M 1/12* (2006.01)

(52) U.S. Cl. .................. 341/155; 356/300; 356/303; 356/310; 356/326; 356/328; 356/330

(58) Field of Classification Search .................. 356/300, 356/303, 310, 326, 328, 330
See application file for complete search history.

(56) References Cited

U.S. PATENT DOCUMENTS 6,046,808 A * 4/2000 Fateley .................. 356/330
6,128,078 A * 10/2000 Fateley .................. 356/330

* cited by examiner

*Primary Examiner*—Khai M Nguyen
(74) *Attorney, Agent, or Firm*—Kasha Law LLC; John R. Kasha

(57) ABSTRACT

An optical signal is compressively sampled using an optical component to encode multiplex measurements. A mapping from the optical signal to a detector array is created using spatial and/or spectral dispersion. Signals transmitted by a plurality of transmissive elements of the optical component are detected at each sensor of a plurality of sensors of the detector array dispersed spatially with respect to the optical component. Each sensor of a plurality of sensors produces a measurement resulting in a number of measurements. A number of estimated optical signal values is calculated from the number of measurements and a transmission function. The transmission function is selected so that the number of measurements is less than the number of estimated optical signal values.

2 Claims, 29 Drawing Sheets

| | | | | | | | |
|---|---|---|---|---|---|---|---|
| 1 | 1 | 1 | 1 | 1 | 1 | 1 | 1 |
| 1 | 1 | 1 | 0 | 0 | -1 | -1 | -1 |
| 1 | 0 | 0 | -1 | -1 | 0 | 0 | 1 |
| 1 | 0 | -1 | -1 | 1 | 1 | 0 | -1 |
| 1 | -1 | -1 | 1 | 1 | -1 | -1 | 1 |
| 1 | -1 | 0 | 1 | -1 | 0 | 1 | -1 |
| 0 | -1 | 1 | 0 | 0 | 1 | -1 | 0 |
| 0 | -1 | 1 | -1 | 1 | -1 | 1 | 0 |

COMPRESSIVE SAMPLING AND SIGNAL INFERENCE

CROSS-REFERENCE TO RELATED APPLICATION

This application is a divisional application of U.S. patent application Ser. No. 11/183,838, filed Jul. 19, 2005, now U.S. Pat. No. 7,283,231 which claims the benefit of U.S. Provisional Patent Application Ser. No. 60/589,475 filed Jul. 20, 2004, U.S. Provisional Patent Application Ser. No. 60/589,530 filed Jul. 20, 2004, and U.S. Provisional Patent Application Ser. No. 60/622,181 filed Oct. 26, 2004. All of the above mentioned applications are incorporated by reference herein in their entireties.

BACKGROUND OF THE INVENTION

1. Field of the Invention

Embodiments of the present invention relate to systems and methods for compressive sampling in spectroscopy and spectral imaging. More particularly, embodiments of the present invention relate to systems and methods for using less than one measurement per estimated signal value in spectroscopy and spectral imaging.

2. Background Information

A signal is a physical phenomenon distributed over a space. Examples include signals distributed over time, such as electromagnetic waves on antennas or transmission lines, signals distributed over Fourier space, such as optical or electrical spectra, and multidimensional signals distributed over physical space, such as 2D and 3D images. Digital signal analysis consists of signal estimation from discrete measurements. For many years, sampling theory formed the theoretical core of signal analysis. Basic signal characterization required regular sampling at a rate proportional to the signal bandwidth. The minimal sampling rate is termed the Nyquist frequency.

Over the past couple of decades, however, novel sampling approaches have emerged. One generalized sampling approach envisioned a bank of filtered copies of a signal at sub-Nyquist rates. Since this generalized sampling approach, a number of generalized sampling strategies and analyses have emerged. Particular attention has been given sampling on multiresolution bases and to irregular sampling. Multiresolution sampling is regarded as a generalization of generalized sampling and is used as a means of balancing sampling rates and parallel signal analysis.

Signal compression technology has developed in parallel with generalized sampling theory. Multiresolution representations, implemented using fractal and wavelet analysis, have been found to be critically enabling for signal compression on the basis of the empirically observed self-similarity of natural signals on multiple scales. For appropriate bases, natural signals yield sparse multiscale representations. Sparsity and hierarchical self-similarity have been combined in signal compression algorithms such as the embedded zero-tree and set partitioning in hierarchical trees algorithms.

Generalized sampling and compression technologies resolve specific challenges in signal processing systems. Generalized sampling enables systems to sample at lower rates than the Nyquist frequency, and data compression enables post-sampling reduction of the system data load.

Previous examples of sub-Nyquist sampling are divided into parameter estimation approaches and interpolation approaches. Parameter estimation uses sampled data to fit an a priori signal model. The signal model typically involves much greater constraints than conventional band limits. For example, one can assume that the signal consists of a single point source or a source state described by just a few parameters. As an example of parameter estimation, several studies have considered estimation of the frequency or position of an unknown but narrow-band source from sub-Nyquist samples. Interpolation generates new samples from measured data by curve fitting between known points.

In view of the foregoing, it can be appreciated that a substantial need exists for systems and methods that can advantageously provide for sub-Nyquist sampling that can be used in spectroscopy and spectral imaging.

BRIEF SUMMARY OF THE INVENTION

One embodiment of the present invention is a method for compressively sampling an optical signal. An optical component with a plurality of transmissive elements and a plurality of opaque elements is created. The location of the plurality of transmissive elements and the plurality of opaque elements is determined by a transmission function. The optical component includes but is not limited to a transmission mask or a coded aperture. The spectrum of the optical signal is dispersed across the optical component. Signals transmitted by the plurality of transmissive elements are detected in a single time step at each sensor of a plurality of sensors dispersed spatially with respect to the optical component. Each sensor of the plurality of sensors produces a measurement resulting in a number of measurements for the single time step. A number of estimated optical signal values is calculated from the number of measurements and the transmission function. The transmission function is selected so that the number of measurements is less than the number of estimated optical signal values.

Another embodiment of the present invention is a spectrometer using compressive sampling. The spectrometer includes a transmission mask, a diffraction grating, a plurality of sensors, and a processor. The transmission mask has a plurality of transmissive elements and a plurality of opaque elements. The location of the plurality of transmissive elements and the plurality of opaque elements is determined by a transmission function. The diffraction grating disperses a spectrum of an optical signal across the transmission mask. The plurality of sensors are dispersed spatially with respect to the transmission mask. Each sensor of the plurality of sensors detects signals transmitted by the plurality of transmissive elements in a single time step. Each sensor also produces a measurement resulting in a number of measurements for the single time step. The processor calculates a number of estimated optical signal values from the number of measurements and the transmission function. The transmission function is selected so that the number of measurements is less than the number of estimated optical signal values.

Another embodiment of the present invention is an optical wavemeter using compressive sampling. The optical wavemeter includes a slit, a diffraction grating, a mask, a complementary grating, and a linear detector array. A monochromatic source is incident on the slit. The diffraction grating produces an image of the slit in an image plane at a horizontal position that is wavelength dependent. The mask has a two-dimensional pattern of transmission variations. The mask produces different vertical intensity channels for different spectral channels. The complementary grating produces a stationary image of the slit independent of wavelength. The linear detector array measures vertical variations in intensity of the stationary image. The mask is created so that a number of measurements made by the linear detector is less than a number of spectral channels sampled.

Another embodiment of the present invention is a method for temporally compressively sampling a signal. A plurality of analog to digital converters is assembled to sample the signal. Each analog to digital converter of the plurality of analog to digital converters is configured to sample the signal at a time step determined by a temporal sampling function. The signal is sampled over a period of time using the plurality of analog to digital converters. Each analog to digital converter of the plurality of analog to digital converters produces a measurement resulting in a number of measurements for the period of time. A number of estimated signal values is calculated from the number of measurements and the temporal sampling function. The temporal sampling function is selected so that the number of measurements is less than the number of estimated signal values.

Another embodiment of the present invention is a method for compressively sampling an optical signal using an imaging system. The imaging system is created from a plurality of subimaging systems. Each subimaging system includes a subaperture and a plurality of sensors. The optical signal is collected at each subaperture of the plurality of subimaging systems at a single time step. The optical signal is transformed into a subimage at each subimaging system of the plurality of subimaging systems. The subimage includes at least one measurement from the plurality of sensors of the subimaging system. An image of the optical signal is calculated from the sampling function and each subimage, spatial location, pixel sampling function, and point spread function of each subimaging system of the plurality of subimaging systems. The sampling function is selected so that the number of measurements from the plurality of subimages is less than the number of estimated optical signal values that make up the image.

Another embodiment of the present invention is a method for spatially focal plane coding an optical signal using an imaging system. The imaging system is created from a plurality of subimaging systems. Each subimaging system includes an array of electronic detectors. Each subimaging system is dispersed spatially with respect to a source of the optical signal according to a sampling function. The optical signal is collected at each array of electronic detectors of the plurality of subimaging systems at a single time step. The optical signal is transformed into a subimage at each subimaging system. The subimage includes at least one measurement from the array of electronic detectors of the subimaging system. An image of the optical signal is calculated from the sampling function and each subimage, spatial location, pixel sampling function, and point spread function of each subimaging system of the plurality of subimaging systems. The sampling function is selected so that the number of measurements for the plurality of subimages is less than the number of estimated optical signal values that make up the image.

Another embodiment of the present invention is a method for temporally focal plane coding an optical signal using an imaging system. The imaging system is created from a plurality of subimaging systems. Each subimaging system includes an array of electronic detectors. The optical signal is collected at each array of electronic detectors of the plurality of subimaging systems at a different time step according to a temporal sampling function. The optical signal is transformed into a subimage at each subimaging system of the plurality of subimaging systems. The subimage includes at least one measurement from an array of electronic detectors of each subimaging system. An image of the optical signal is calculated from the temporal sampling function and each subimage, time step, pixel sampling function, and point spread function of each subimaging system of the plurality of subimaging systems. The temporal sampling function is selected so that the number of measurements for the plurality of subimages is less than the number of estimated optical signal values comprising the image.

Another embodiment of the present invention is a method for spatially and temporally focal plane coding an optical signal using an imaging system. The imaging system is created from a plurality of subimaging systems. Each subimaging system includes an array of electronic detectors. Each subimaging system is dispersed spatially with respect to a source of the optical signal according to a spatial sampling function. The optical signal is collected at each array of electronic detectors of the plurality of subimaging systems at a different time step according to a temporal sampling function. The optical signal is transformed into a subimage at each subimaging system of the plurality of subimaging systems. The subimage includes at least one measurement from an array of electronic detectors of the each subimaging system. An image of the optical signal is calculated from the spatial sampling function, the temporal sampling function and each subimage, spatial location, time step, pixel sampling function, and point spread function of each subimaging system of the plurality of subimaging systems. The spatial sampling function and the temporal sampling function are selected so that the number of measurements for the plurality of subimages is less than the number of estimated optical signal values that make up the image.

Another embodiment of the present invention is a method for compressively sampling an optical signal using multiplex sampling. Group measurement of multiple optical signal components on single detectors is performed such that less than one measurement per signal component is taken. Probabilistic inference is used to produce a decompressed optical signal from the group measurement on a digital computer.

Another embodiment of the present invention is method for compressively sampling an optical signal. A reflective mask is created with a plurality of reflective elements and a plurality of non-reflective elements. The location of the plurality of reflective elements and the plurality of non-reflective elements is determined by a reflection function. A spectrum of the optical signal is dispersed across the reflective mask. Signals reflected by the plurality of reflective elements are detected in a single time step at each sensor of a plurality of sensors dispersed spatially with respect to the reflective mask. Each sensor of a plurality of sensors produces a measurement resulting in a number of measurements for the single time step. A number of estimated optical signal values is calculated from the number of measurements and the reflection function. The reflection function is selected so that the number of measurements is less than the number of estimated optical signal values.

Another embodiment of the present invention is a method for compressively sampling an optical signal using an optical component to encode multiplex measurements. A mapping is created from the optical signal to a detector array by spatial and/or spectral dispersion. Signals transmitted are detected by a plurality of transmissive elements of the optical component at each sensor of a plurality of sensors of the detector array dispersed spatially with respect to the optical component. Each sensor of the plurality of sensors produces a measurement resulting in a number of measurements. A number of estimated optical signal values is calculated from the number of measurements and a transmission function, wherein the transmission function is selected so that the number of measurements is less than the number of estimated optical signal values.

Another embodiment of the present invention is a spectrometer using compressive sampling. The spectrometer includes a plurality of optical components and a digital computer. The plurality of optical components measure multiple linear projections of a spectral signal. The digital computer performs decompressive inference on the multiple linear projections to produce a decompressed signal.

BRIEF DESCRIPTION OF THE DRAWINGS

FIG. 6 is an exemplary 8×8 transformation code for a quantized cosine transform, in accordance with an embodiment of the present invention.

Figure 1:
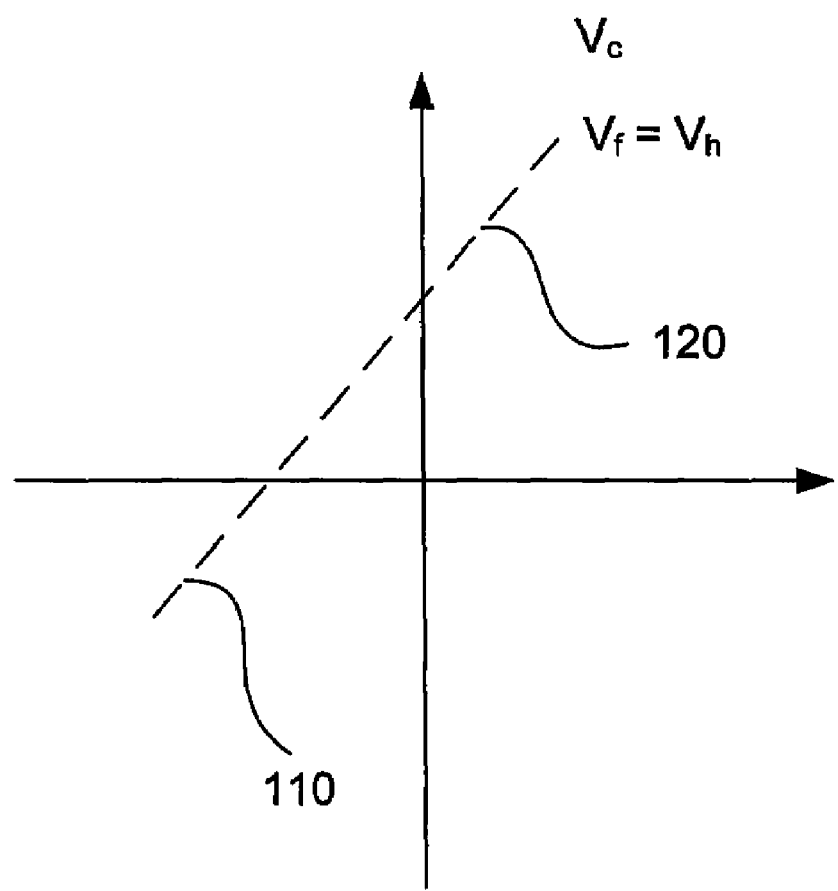
FIG. 1 is an exemplary plot of a planar function space where a subspace spanned by the physical sampling is isomorphic to a subspace spanned by possible signals, in accordance with an embodiment of the present invention.
Figure 1:
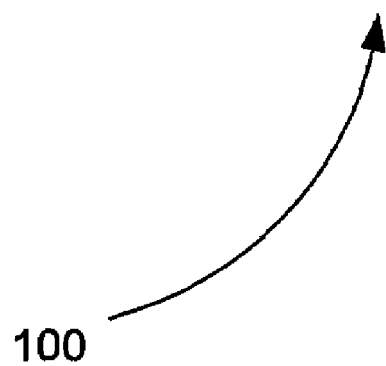

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The goal of compressive sampling is to reduce the number of measurements needed to characterize a signal. The defining characteristic of compressive sampling is that less than one measurement is registered in the system per signal value estimated. Compressive sampling can be viewed as an implementation of data compression in the physical layer.

One embodiment of the present invention is a method for using compressive sampling in optical imaging and spectroscopy. Positivity is the defining feature of images and spectra. The nominal detected signal is envisioned as a positive count of the number of photons detected over a certain spatial and temporal window. It is, of course, possible to introduce negative and complex weights in optical measurements using spatial, temporal or spectral filters. For optical imaging, compressive sampling enables cameras with more pixels in the estimated image than in the electronic focal plane. Compressive sampling can be particularly important in spectral and temporal sampling of image data, in which cases the number of measurements per spatial resolution element can or cannot exceed one but the number of measurements per estimated sample in the full space-time-spectral data cube is much less than one. For optical spectroscopy, compressive sampling enables spectral characterization with fewer detectors than conventional systems. Deeper spectroscopic significance arises, however, from using compressive sampling for direct molecular or atomic analysis without forming a conventional spectrum.

Linearity and predeterminism are the defining features of sampling strategies. Linearity refers to the condition that measurements, g, consist of linear projections of a source state f. Formally the measurement process is expressed as g=Hf+b, where b represents noise. Predeterminism refers to the condition that the measurement transformation H is fixed prior to measurement and is independent of the outcome of any single measurement. While there are many examples of adaptive measurement in both imaging and spectroscopy, simplicity dictates focusing on single step non-adaptive measurement.

Compressive sampling integrates previous work in signal sampling, representation and compression, multiplex sensing and group testing. Compressive sampling is a novel approach for sub-Nyquist frequency measurement. One novelty is in the combination of generalized sampling and multiscale data compression strategies with two previously unrelated approaches: multiplex sensing and group testing. Multiplex sensing consists of taking measurements that depend on multiple source points in the object space under examination.

Multiplex sensing involves the concept of the object space. The object space terminology originates in spectroscopy, where Fourier and Hadamard transform instruments are referred to as multiplex spectrometers in contrast to isomorphic instruments based on grating diffraction. In optical systems, multiplex sensing has also been applied in coded aperture and interferometric imaging systems. A variety of other sensor modalities are viewed as multiplex systems, including computed tomography and coherence tomography sensors.

Conventionally, the attractions of multiplex sensing have included increased throughput (e.g., better light detection efficiency) and improved signal verses noise discrimination via weighing design. In tomographic systems, the additional advantage of native multidimensional image reconstruction arises. Recently reference structure tomography has been explored as a new approach to multiplex sensing and it has been shown that the additional advantage of compressive sampling can be obtained in multiplex systems.

Previously, it was shown that the number of measurements needed to characterize a sample can be reduced by adaptive multiscale sensing. This approach combined conventional measurements with prior knowledge of the expected multiscale structure of the object under analysis. While quite effective in guiding magnetic resonance image acquisition, this approach requires data be acquired in serial and that current and future measurements depend on past measurements. These constraints are unattractive in real-time spectroscopy and imaging.

Compressive sampling extends the adaptive multiscale sensing approach by using multiplex sensing to implement group testing on multiscale features. Group testing has generally been applied to analysis of discrete objects, such as coins, weights or chemical samples. Another embodiment of the present invention is a method that applies group sampling to filter bank samples drawn from spatially distributed signals. In this embodiment, group testing consists of making signal measurements which depend on disjoint groups of resolution or filter elements abstracted from the signal.

1. Sampling in Signal Representation and Measurement

Representation sampling is distinct from measurement sampling. Representation sampling refers to the mathematical representation of a continuous function $f(x)$, $x \in R^d$, in terms of finite or countably many discrete numbers. A representation sampling system consists of a rule for generating sample values from $f(x)$ and a rule for approximating $f(x)$ from the sample values. As an example, the sampling rule for Nyquist-Shannon sampling returns values of $f(x)$ at equally spaced points and signal approximation consists of summing products of sample values with the sinc basis. Measurement sampling refers to the physical process of measuring "samples" of $f(x)$. For example, a camera measures samples of the light intensity on a focal plane. The measurement samples are the raw signal values measured from the physical pixels.

Imagers and spectrometers infer representation samples from measurement samples of physical signals. In many cases, as in a simple camera, it is assumed that representation samples are identical to measurement samples. Of course, representation samples are not unique for a given signal. Sensor systems are often modeled by continuous transformations of $f(x)$, as in the Fourier or Radon transform, prior to discrete sampling. In these cases, representations are constructed using discrete bases on the transformed space, and measurement samples are treated as representation samples on the transform space. This approach is taken, for example, in x-ray tomography. Representation samples can also take many forms on the native continuous space of $f(x)$. In most cases it is assumed that this space is $L^2(R^d)$. Many bases spanning subspaces of $L^2(R^d)$ have been considered over the past twenty years in the context of wavelet and generalized sampling theories. Compression and multiscale signal fidelity have been primary motivators in considering new bases, which have not generally been closely associated with measurement sampling.

Measurement sampling on transformed spaces are selected on the basis of physical characteristics of measurement systems. Tomographic systems, for example, measure Radon transforms rather than native samples because Radon data can be measured non-invasively. Generalized representation sampling, in contrast, has been considered primarily in post-processing. It is possible to design sensors for which measurements directly estimate generalized representation samples, but to date examples of this approach are rare. In optical systems, physical constraints, in particular, require that optical signals be non-negative, and modal coherence constraints limit the capacity to implement arbitrary sampling schemes.

Isomorphism between representation samples and measurement samples is not necessarily a design goal. In Radon and Fourier transform sensor systems, the fact that measurement is not local on the native signal space is generally treated as an annoyance. Generalized representation sampling focuses primarily on high fidelity description of the signal on the native space. In contrast, the goal of compressive sampling is to ensure that measured data is as useful as possible in estimating the signal. Given a finite number of measurements, surprisingly little analysis of whether or not conventional samples represent a good strategy has been done. Issues of uniform verses nonuniform sampling have been widely considered, but such analyses normally consider the sample itself to relatively simple and local in a continuous space.

A precise model for what is meant by a "measurement" and how the measurement is associated with the signal is needed. The process of measurement is associated with the process of analog to digital conversion, and measurement is specifically defined to be the process of abstracting a digital number from an analog process. A measurement sample is thus a digital number with at least partial dependence on an analog state.

While representation samples are in theory continuous or discrete, in practice representation sample values are also rational numbers. The primary difference between measurement samples and representation samples is that representation samples are associated in some simple way with signal values in a continuous space. Measurement samples are, in principle, associated with any property of the signal and need not be locally dependent on the signal value.

Optical sensing includes a long history of sensing based on non-local measurements, dating back to before the Michelson interferometer. Concepts of locality are also fluid in optics. For example, Fourier space is the native signal space for spectroscopy. Over the past half century, Fourier and Hadamard spectrometers have been particularly popular non-local measurement systems. Sensors for which measurements depend on multiple points in the native signal space are called multiplex sensors in the optical literature.

Embodiments of the present invention examine and exploit deliberately encoded differences between representation samples and measurement samples. In particular, these embodiments show that the number of measurements needed to characterize a signal can be less than the number of representation samples used to describe the signal. A system in which less than one measurement is made per reconstructed representation sample is compressively sampled. Multiplex sensing is essential to compressive sampling.

The process of transforming measurement samples to the representation space is referred to as signal inference. In this section, basic relationships between representation samples and measurement samples are established. The process of physical layer signal compression as implemented by multiplex measurements is described and characterized. Linear and nonlinear decompression strategies are detailed. Finally, algorithms, designs, and performance of compressive sampling systems are considered in succeeding sections.

Representation sampling is described by sampling functions $\psi_i(x)$ and reconstruction functions $\phi_i(x)$ such that the signal $f$, $f \in L^2(R^d)$, is represented as $$f(x) = \sum_i f_i \phi_i(x), \tag{1}$$

where $$f_i = \langle \psi_i, f \rangle = \int f(x) \psi_i(x) dx. \tag{2}$$

In Whittaker-Shannon sampling, for example, $\phi_i(x)=\mathrm{sinc}(\pi(x-i))$ and $\psi_i(x)=\delta(x-i)$, assuming the sampling period is scaled to one. A representation sampling model is a mapping between a sample space of discrete vectors and a reconstruction space of continuous functions. The function space associated with Shannon's sampling, for example, consists of band-limited functions in $L^2(R)$, any function $f(x)$ in the subspace can be exactly represented, or reconstructed perfectly from the samples, by Eqn. (1).

Discrete representation of a continuous function is the motivation for representation sampling. Ideally, $f(x)$ lies within the subspace spanned by the sampling functions. In practice, the process of projecting $f(x)$ onto the sampling basis and representing on the reconstruction basis is a projection of f(x) onto a subspace of the full range of possible signals.

For simplicity, the case that a model uses the same family of orthonormal functions $\phi_i(x)$ for both the sampling and the reconstruction functions is considered. Vector $\phi$ denotes the function family and $V_c$ denotes the associated function space. For any function $f(x) \in V_c$, its orthogonal projection onto the space spanned by $\phi_i(x)$ is $\langle \phi_i, f \rangle \phi_i(x)$. $\langle \phi i, f \rangle$ is referred to as the canonical component or representation of $f$ along the canonical axis $\phi_i(x)$. The canonical representation of $f \in V_c$ is then the vector $$f_c = \int_x \phi(x) f(x) dx \tag{3}$$

In general, $f_c^T \phi$ is the projection of $f$ into the space $V_c$. The components of $f_c$ are referred to as the canonical signal values. In the case of a digital imaging system, $f_c$ is the digital image of the object. In the case of a spectrometer, $f_c$ represents the projection of the spectrum of the source under test into the space $V_c$.

In contrast to representation sampling, the goal of measurement sampling is to convert the analog realization of a signal into digital form. The measurement samples need not be simply connected to a reconstruction basis and the measurement sampling functions need not be drawn from an orthogonal basis. A linear measurement system transforms $f(x)$ into discrete measurements, denoted by g, as follows $$g = \int_x h(x) f(x) dx \tag{4}$$

where h is the vector of measurement response functions $h_n(x)$, which is also referred to as the physical sampling functions. In contrast with the sophisticated and complete basis of Shannon sampling, the rectangle averaging function is common in measurement sampling. A digital camera, for example, integrates the value of the optical intensity over a square pixel.

Measurement sampling is connected to representation sampling through the physical sampling functions $h_n(x)$. In designing an optical sensor system, h(x) and the representation basis $\phi_n(x)$ are selected such that $h_n(x) \in V_c$. Then, $$h = H\psi, \quad (5)$$

with $$h_{ij} = \int h_i(x)\psi_j(x)dx. \quad (6)$$

In view of Eqn. (3) and Eqn. (5), Eqn. (4) can be expressed as follows $$g = Hf_c + b \quad (7)$$

where b represents noise.

The goal of imaging systems and spectrometers is to estimate $f(x)$ via $f_c$ from the physical measurements g. Eqn. (7) is the basic model for the forward transformation from $f(x)$ to measurements. Signal estimation consists of inversion of this model. The utility and effectiveness of these systems is evaluated based on measures of the fidelity between the estimated and canonical signals. The measurement system is completely specified by matrix H. It is a multiplex system if H has non-zero off-diagonal elements. A measurement system is compressive if the length of g is less than the length of $f_c$ (i.e., the number of rows is less than the number of columns in H).

With compressive sampling, the null space of H is multidimensional. $V_h$ represents the subspace of $V_c$ spanned by the physical sampling functions. $V_\perp$ represents the subspace orthogonal to $V_h$ in $V_c$. Functions in $V_\perp$ produce zero measurement by the measurement system H. The canonical representation of function $f \epsilon V_c$ can be decomposed into two components, $f_c = f_h + f_\perp$, representing the components of $f$ in $V_h$ and $V_\perp$, respectively.

Since $f_\perp$ produces zero measurement, Eqn. (7) reduces to $$g = Hf_h + b \quad (8)$$

Eqn. (8) is generally well-conditioned for estimation of $f_h$. But estimation of $f_\perp$ from g is impossible in general without further information.

Signal inference is the process of estimating $f_c$ from $f_h$ with additional knowledge about the signals of interest. $V_f$ denotes the subset of $V_c$ spanned by possible signals $f(x)$. If $V_h$ is isomorphic to $V_f$, g approximates $f_c$. If $V_h$ is indicative of $V_f$, there is a one-to-one mapping between g and $f_c$.

Figure 2:
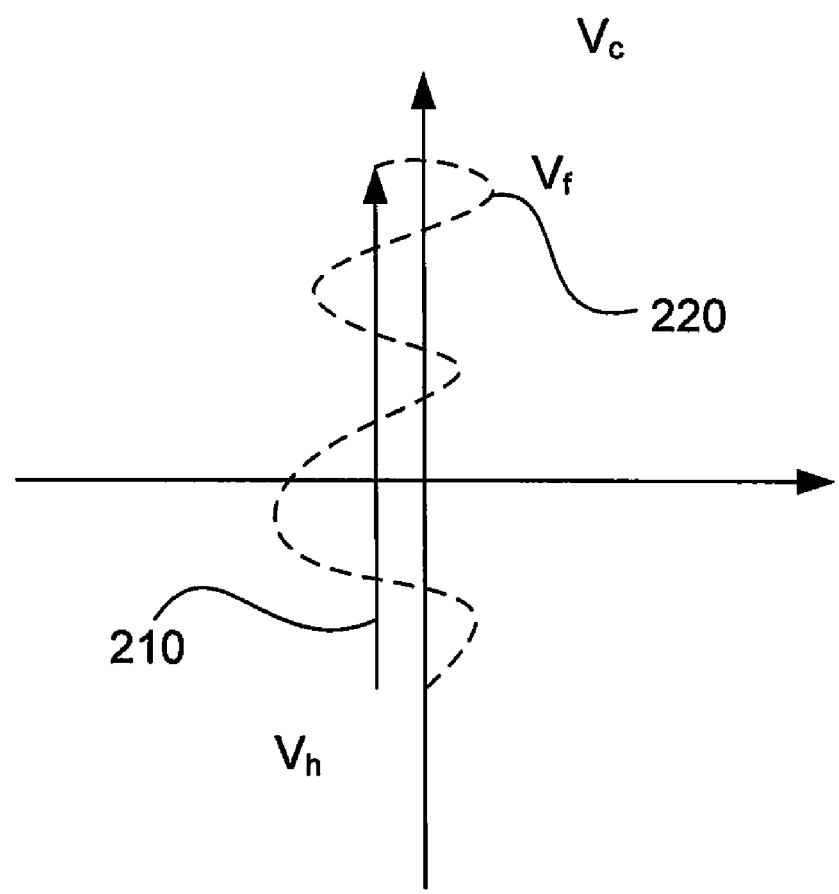
FIG. 2 is an exemplary plot of a planar function space where a subspace spanned by the physical sampling is indicative of a subspace spanned by possible signals, in accordance with an embodiment of the present invention.
Figure 2:
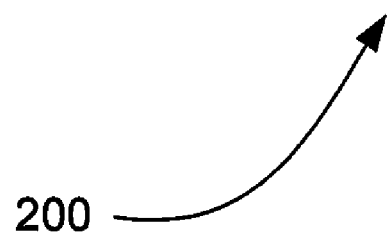

The distinction between isomorphic and indicative measurement is shown in FIGS. 1 and 2, where $V_c$ is a plane. FIG. 1 is an exemplary plot of a planar function space 100, $V_c$, where a subspace spanned by the physical sampling 110, $V_h$, is isomorphic to subspace spanned by possible signals 120, $V_f$, in accordance with an embodiment of the present invention. Isomorphic signal inference is attractive when $V_f$ 120 corresponds to a linear subset of $V_c$ 100. In FIG. 1, $V_f$ 120 corresponds to a line on the plane. $V_h$ 110 is made equal to line 120.

In FIG. 1, $V_f$ 120 is a straight line, or an affine space in $V_c$ 100. A simple linear projection is be used to relate $V_h$ 110 to $V_f$ 120. The projection completely describes the state of the signal $f_c$. The sampling is therefore compressive and the inference is linear.

FIG. 2 is an exemplary plot of a planar function space 200, $V_c$, where a subspace spanned by the physical sampling 210, $V_h$, is indicative of a subspace spanned by possible signals 220, $V_f$, in accordance with an embodiment of the present invention. Indicative signal inference is attractive when $V_f$ 220 is indexed by a linear projection of $V_c$ 200. In FIG. 2, $V_f$ 220 corresponds to a curve on the plane. If $V_h$ 210 is a line parallel to the vertical axis, a one-to-one correspondence is drawn between points in $V_h$ 210 and points in $V_f$ 220. Each point in $V_h$ 210 is mapped on to the corresponding point in $V_f$ 210 by adding a unique vector drawn from $V_\perp$.

In FIG. 2, $V_f$ 220 is a curve of one parameter. Its canonical components are dependent on the parameter. The component $f_h$, by compressive sampling, can be used as an index or as parameters of $f_c$. When $V_f$ 220 is known a priori, $f_h$ uniquely determines the signal $f_c$.

The challenge in isomorphic measurement is to discover the subset of $V_c$ that approximates $V_f$. Discovery is accomplished by Karhunen-Loève decomposition, for example, and similar methods. Indicative measurement poses the dual challenges of characterizing $V_f$ and of development of an algorithm to map g on to $f_c$. While isomorphic inference is always linear in g, linear and nonlinear methods of indicative inference can be considered.

The primary challenges in using signal inference to achieve compressive sampling are characterization of $V_f$, design of H such that $V_h$ is both indicative of $V_f$ and physically achievable in sensor hardware, and development of an efficient and accurate algorithm mapping g into an estimate for $f_h$ and mapping the estimated $f_h$ into an estimate for $f_c$.

In the case of linear signal inference, $V_f$ is typically characterized by analyzing a representative sample of signals methods such as Karhunen-Loève decomposition. Estimation algorithms are relatively straightforward in this case. In nonlinear inference, $f_h$ is linearly determined by measurement g, but the relationship between g and $f_\perp$ is nonlinear and represented via the integration of the information of $f_h$ with prior knowledge regarding $V_f$. For example, efficient group testing sensors have been demonstrated for the case in which $V_f$ is known to consist of isolated point sources in $V_c$. In an extreme case, it is known that $f_c$ has at most one nonzero component. Signals of much greater complexity for which an articulated description of $V_f$ is unavailable are considered below.

For signal reference, various methods to explore and exploit the relationship between g and $f_\perp$ are presented. For example, the components of $f_c$ from multi-scale group testing measurement have a hierarchically local relationship. After the estimation of $f_h$, methods that attempt to optimize certain objective measures over the null space of H are used, subject to certain constraints. Both the optimization objectives and the constraints are based on the priori knowledge of the targeted signals. The priori knowledge may be described by physical models, statistical models, or their combinations. For example, one set of group testing methods rely on Bayesian inference based on statistical models of spectra and images as well as multiplex measurements.

2. Sampling in Spectroscopy and Imaging

Earlier it was shown that a linear sensor drawing measurement samples from a continuous distribution is characterized by the representation sample to measurement sample mapping $$g = Hf_c + b \quad (9)$$

Here the physical realization of this mapping in optical spectrometers and imagers is considered.

In some optical systems, such as coherent holography, the optical field is characterized such that g, H and $f_c$ are bipolar or complex. In conventional photography and spectroscopy, however, $f_c$ represents a nonnegative power spectral density or radiance. It is assumed that the components of g, H and $f_c$ are nonnegative and real. The primary motivation for this restriction is the realization that potential bipolar or complex representations not withstanding, the vast majority of images and spectra of interest are represented as nonnegative arrays.

Within the constraint of normegativity, the broad classes of transformations H are implemented on spectra and images in optical systems. Many examples of Hadamard and Fourier transform spectroscopy and imaging systems have been implemented. Nonnegative Hadamard and Fourier transforms are implemented in these systems by adding a constant positive bias to the transformation kernel. Hadamard transform spectrometers, for example, sample the S matrix, where if H is a Hadamard matrix S=(1+H)/2. Similarly Fourier transform systems sample (1+R{F})/2 where F is the Fourier transform kernel.

Selection of a physically achievable and numerically attractive kernel H is the core of sensor system design. In some cases, such as 3D imaging, H must have a multiplex structure because identity mappings are not physically achievable. In conventional spectroscopy and imaging, however, identity mapping is physically achievable if aperture size and system volume are not constrained. Despite the fact that the identity mapping is the only mapping with condition number one under the non-negativity constraint, in some cases multiplexing is performed as a means of achieving compressive sampling and of optimizing design constraints such as sensor cost, sensor sampling rate, and design geometry.

Figure 3:
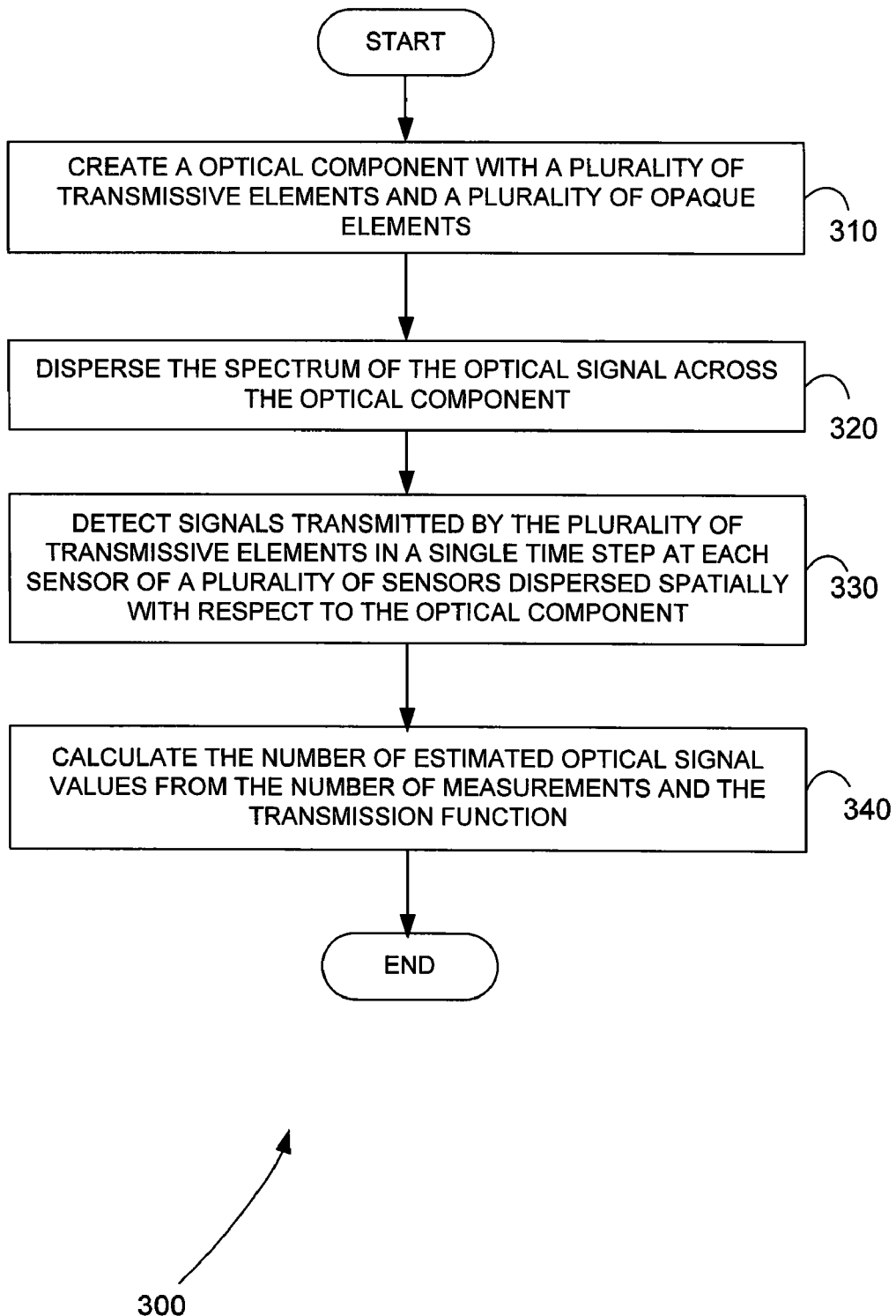
FIG. 3 is a flowchart showing an exemplary method for compressively sampling an optical signal using a spectrometer, in accordance with an embodiment of the present invention.

FIG. 3 is a flowchart showing an exemplary method 300 for compressively sampling an optical signal, in accordance with an embodiment of the present invention.

In step 310 of method 300, an optical component with a plurality of transmissive elements and a plurality of opaque elements is created. The location of the plurality of transmissive elements and the plurality of opaque elements is determined by a transmission function. The optical component includes but is not limited to a transmission mask or a coded aperture.

In step 320, the spectrum of the optical signal is dispersed across the optical component.

In step 330, signals transmitted by the plurality of transmissive elements are detected in a single time step at each sensor of a plurality of sensors dispersed spatially with respect to the optical component. Each sensor of the plurality of sensors produces a measurement resulting in a number of measurements for the single time step.

In step 340, a number of estimated optical signal values is calculated from the number of measurements and the transmission function. The transmission function is selected so that the number of measurements is less than the number of estimated optical signal values.

In another embodiment of the present invention, the number of estimated optical signal values is calculated by multiplying the number of measurements by a pseudo-inverse of the transmission function. In another embodiment of the present invention, the number of estimated optical signal values is calculated by a linear constrained optimization procedure. In another embodiment of the present invention, the number of estimated optical signal values is calculated by a non-linear constrained optimization procedure. In another embodiment of the present invention, the optical component is adaptively or dynamically variable. In another embodiment of the present invention, the adaptively or dynamically variable optical component is based on electro-optic effects, liquid crystals, or micro mechanical devices. In another embodiment of the present invention, the optical component implements positive and respective negative elements of an encoding.

Figure 4:
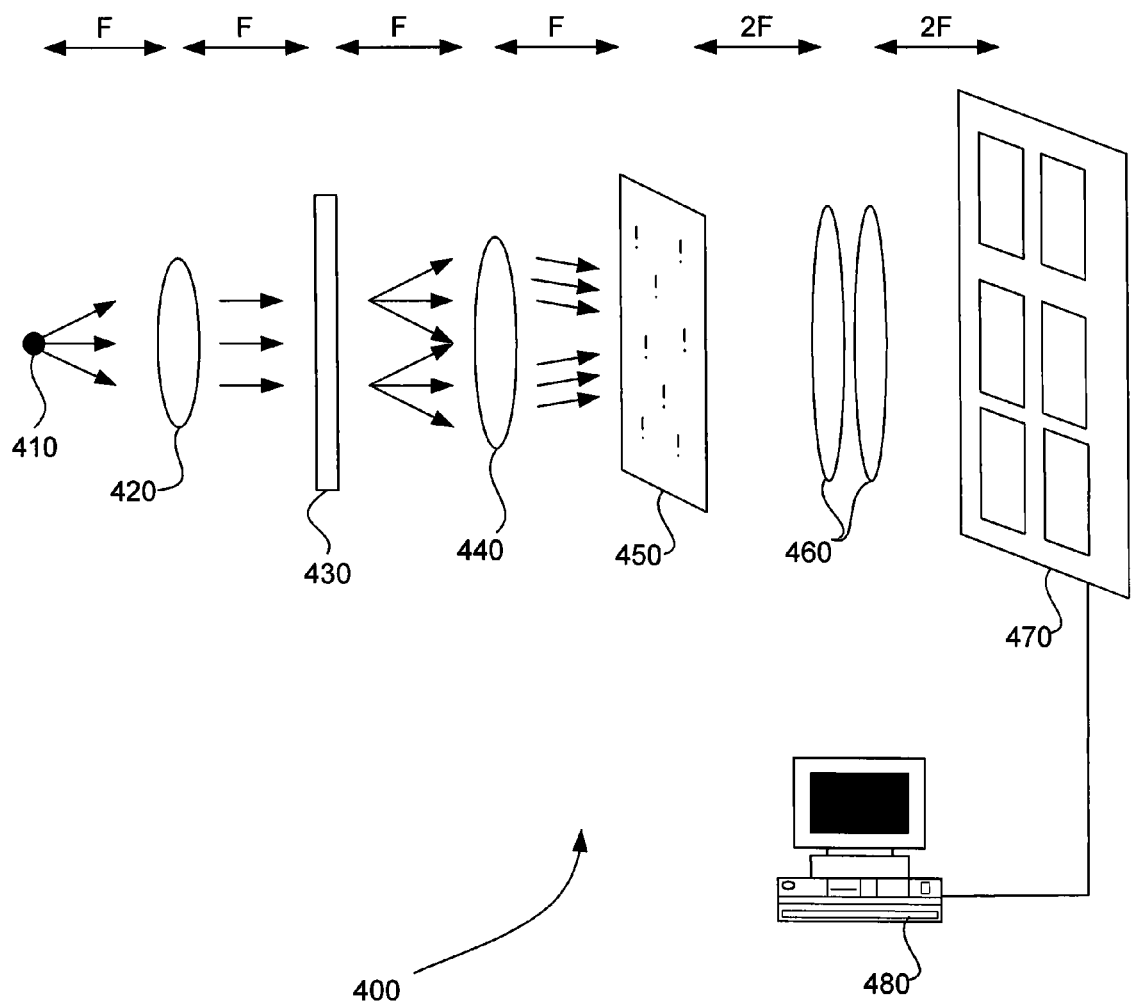
FIG. 4 is a schematic diagram of an exemplary spectrometer implementing arbitrary mapping, in accordance with an embodiment of the present invention.

Arbitrary nonnegative mappings are implemented in spectroscopy. FIG. 4 is a schematic diagram of an exemplary spectrometer 400 implementing arbitrary mapping, in accordance with an embodiment of the present invention. Single mode spectrometer 400 is a baseline design. In spectroscopy of a single spatial mode, the input field is mapped through a pinhole spatial filter 410. Pinhole 410 is collimated by spherical lens 420 and diffracted by grating 430. Grating 430 disperses the spectrum by creating a linear mapping between direction of propagation or wavenumber and wavelength. Cylindrical lens 440, following grating 430, focuses the field along the dispersion direction such that spectral components at coded mask 450 are separated into lines. If each line is a column, codes arranged perpendicular to the dispersion direction in coded mask 450 modulate the spectrum in rows. The $ij^{th}$ pixel on coded mask 450 then corresponds to the $ij^{th}$ component of H, $h_{ij}$. The value of $h_{ij}$ equal to the transmittance of coded mask 450 at the corresponding pixel and is set arbitrarily between zero and one. The power transmitted by each row is focused by cylindrical lens pair 460 on to single output detector 470, such that the set of measurements made on the output detector is g=Hf, where f corresponds to the power spectral density of the input source. f is calculated from g and H using processor 480, for example.

FIG. 4 demonstrates a form of compressive sampling in building an optical wavemeter, in accordance with an embodiment of the present invention. While this approach demonstrates that any filter array can be implemented in a spectrometer, the resulting system is physically nearly as large as a fully sampled spectrometer with the same resolution. Another embodiment of the present invention is a multiplex spectrometer with much smaller size that uses a photonic crystal filter. In this embodiment, which is a compact system, it is not possible to implement arbitrary filter functions. In other embodiments of the present invention, coded mask 450 is implemented using a holographic filter, a holographic filter array, a multiplex grating hologram, a multipass interferometer, a thin film filter, an array of thin film filters, and an array of photonic crystal filters.

Another embodiment of the present invention is a method involving multiscale sampling and group testing of correlated and uncorrelated signal components. Signals are random processes with finite correlation distances. In the simplest model the signal component $f_i$ is highly correlated with the signal component $f_{i+1}$, but is independent of $f_{i+N}$ for sufficiently large N. Thus, if a group test is implemented on two uncorrelated coefficients linear combinations of $f_i$ and $f_{i+N}$ can be measured. Such delocalized group tests are easily implemented in a long baseline spectrometer system.

Figure 5:
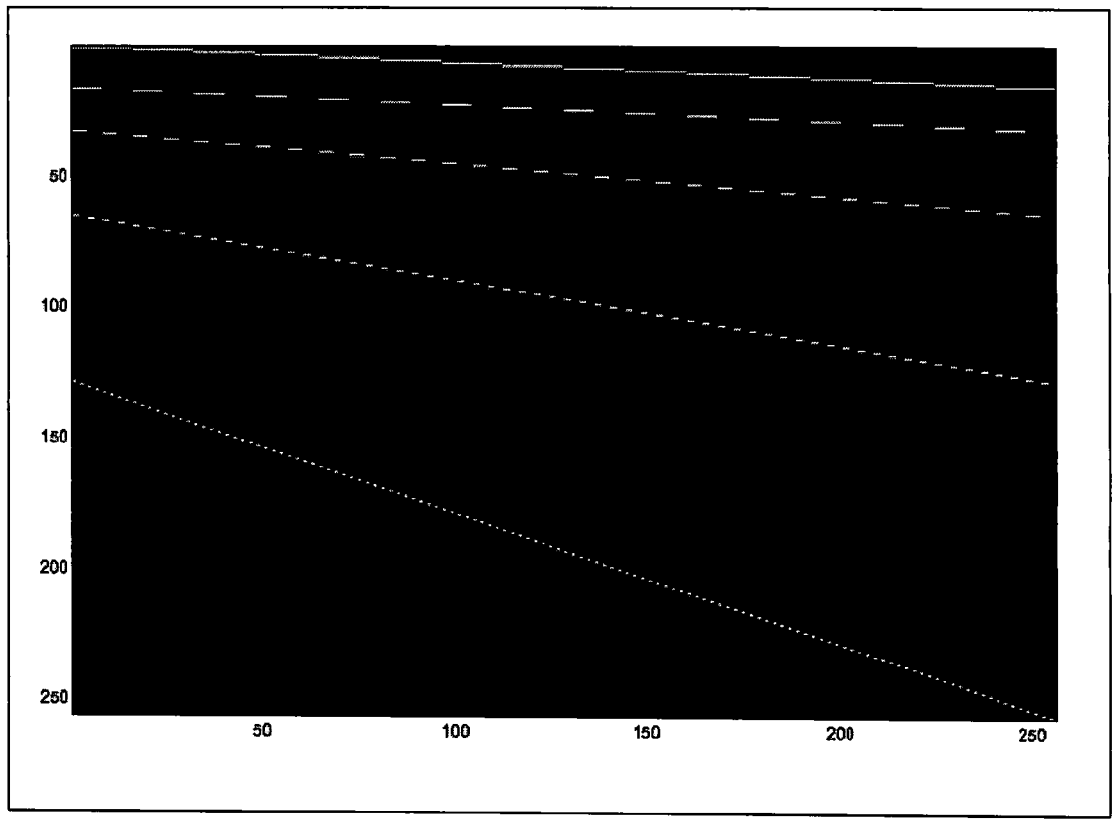
FIG. 5 is a plot of an exemplary spectral transmission mask for multiscale Haar sampling, in accordance with an embodiment of the present invention.
Figure 5:
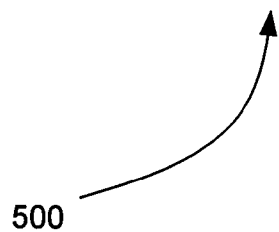

FIG. 5 is a plot of an exemplary spectral transmission mask 500 for multiscale Haar sampling, in accordance with an embodiment of the present invention. Transmission mask 500 is, for example, coded mask 450 of spectrometer 400 in FIG. 4. In transmission mask 400, the spectrum consists of 256 channels. The first 16 rows sample the mean spectrum of length 16 blocks. The next 16 rows sample the means of the first eight channels sampled in the previous blocks, the final 128 measurements sample individual channels. Mask 500 represents a unipolar nonnegative sampling of the Haar wavelet decomposition, with normegativity obtained by zeroing the negative components as discussed above for Hadamard and Fourier spectroscopy. Mask 500 is not compressive, 256 spectra are reconstructed from 256 measurements.

Arbitrary group testing is more challenging in imaging systems. While global transformations H are available in interferometric imaging systems, it is much easier to implement mappings such that only a compact region of signal elements is active in any row of H, corresponding to measurements that sample only a local neighborhood in the image. Pixel remapping for measurement in imaging systems is achieved through optical elements, such as multiple apertures, beamsplitters, gratings or birefringent elements or by electronic combination of sensor values on the detection plane.

3 Linear Signal Inference

In linear signal inference, the estimated or reconstructed signal, via its canonical representation $f_c$, is linearly related to the measurements g. Ideally, the sampling space $V_h$ contains the source space $V_s$. While digital compression systems may implement essentially any transformation H for any specified source space, the range of physically achievable sensor transformations is more limited. In other words, $V_h$ and $V_s$ are not the same in many practical situations. The component $f_\perp$ is estimated in the subspace orthogonal to $V_h$, based on both the obtainable solution $f_h$ and priori knowledge about the joint space of $V_s$ and $V_\perp$. The priori knowledge is described in two aspects: the physical aspect and the statistical aspect. It can be exploited in signal estimate or reconstruction as well as in the design of sampling system H.

3.1 Compressive Sampling

The primary challenge of compressive sampling by linear inference lies in the joint optimization of the logical suitability and physical plausibility of H. The design of sensing system H includes the selection of representation basis functions ψ and the design of sampling functions. In imaging, it is both desirable and feasible to select representational functions with spatially local support at multiple scales, such as a family of multi-scale wavelet functions. In spectroscopy, a spectral function is expected to be continuous and have one or more than one peak. Representational functions are selected so that both the base and peak features are captured well with as few as possible basis functions. Some representational functions, therefore, have global support.

3.1.1 Quantized Cosine Transform (QCT)

In one embodiment of the present invention, the elements of H are drawn from the set (−1,0,1). This embodiment is implemented using complementary measurements $H_1$ and $H_2$ such that $H=H_1-H_2$ with elements of $H_1$ and $H_2$ drawn from the binary set (0,1). Coding schemes based on such matrices can be implemented.

A non-compressive design is viewed as an extreme case where all measurements are used. In a compressive design, certain transforms are used to enable measurements of the principle components of the source image in a representation and to enable source estimates by numerical decompression with high fidelity.

In another embodiment of the present invention an image source is partitioned into blocks of, for example, 8×8 pixels. Consider the double-sided transformation of each 8×8 block $S_{ij}$, $C_{ij}=QS_{ij}Q^\dagger$. FIG. 6 is an exemplary 8×8 transformation matrix 600, Q, for a QCT, in accordance with an embodiment of the present invention.

Transform matrix 600 has the following properties. Its elements are from the set (0, 1, −1). The rows of matrix 600 are orthogonal. The row vectors are nearly even in Euclidean length, with the ratio between the largest and the smallest. When the source image is spatially continuous within block $S_{ij}$, the transformed block $C_{ij}$ exhibits the compressible property that its elements decay along the diagonals. The elements on the lower anti-diagonals are, therefore, truncated and the remaining elements are measured with fewer sensors. Denote by $\overline{C}_{ij}$ the truncated block matrix. An estimate of the source block $S_{ij}$ is then obtained from $Q^{-1}\overline{C}_{ij}Q^\dagger$ (decompression). The same transform matrix is used for all blocks of image S.

The above ideas are similar to the image compression with discrete cosine transforms, as used in the JPEG protocol. In fact, the specific matrix Q can be obtained by rounding the discrete cosine transform (DCT) of the second kind into the set (0, 1, −1). Q is referred to as the quantized cosine transform (QCT). But, the very structure of the QCT matrix itself can be used to explain the compression.

Figure 7:
FIG. 7 is a comparison of exemplary simulated image reconstructions using permuted Hadamard transform, discrete cosine transform, and quantized cosine transform matrices using 4.69%, 15.63%, and 32.81% of the transformed components or available measurements, in accordance with an embodiment of the present invention.
Figure 7:
Figure 7:
Figure 7:
Figure 7:
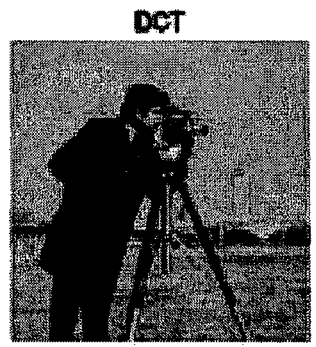
Figure 7:
Figure 7:
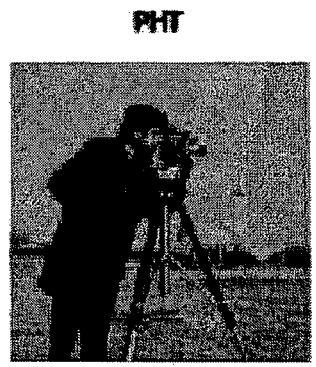
Figure 7:
Figure 7:
Figure 7:
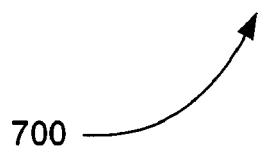

FIG. 7 is a comparison 700 of exemplary simulated image reconstructions using permuted Hadamard transform (PHT), DCT, and QCT matrices using 4.69%, 15.63%, and 32.81% of the transformed components or available measurements, in accordance with an embodiment of the present invention. Visually the effectiveness of the compression with the QCT is surprisingly close to that with the DCT. A PHT matrix with row ordering [1, 5, 7, 3, 4, 8, 2, 6] is also used. Based on the basic 8×8 QCT and PHT matrices, larger transform matrices of hierarchical structure can be constructed for multiple resolution analysis.

3.2 Signal Inference by Deterministic Characteristics

Another embodiment of the present invention is a method for linear signal inference. More specifically, a first order approximation of $f_\perp$ from $f_h$ is estimated based on priori knowledge of the source space. Priori knowledge about deterministic features of a signal distribution is described, accurately or approximately, by linear operators mapping from $f_h$ to $f$. The following optimization problem for locating the deviation is based on the priori knowledge about the source function $$\min_{f_n \in null(H)} \|\nabla (f_* + f_n)\|_2 = \min_{y} \|\nabla (f_* + Ny)\|_2 \quad (10)$$

where $\nabla$ is the backward finite difference, or the discrete gradient, the column of N span the null space of H, and $\|\cdot\|_2$ is the Euclidean vector norm. In matrix form, the matrix for the backward finite difference, denoted by $B_\nabla$, is a lower bidiagonal matrix with all the diagonal elements equal to 1 and all the supper-diagonal elements equal to −1. Via the normal equation corresponding to the minimization problem (10), the explicit linear dependence of $f_n$ on $f^*$ is as follows $$f_n = Ny = N(C^TC)^{-1}C^TB_\nabla f^* \quad (11)$$

where $C=B_\nabla N$. In practical computation, the matrix N can be obtained once for all from H such as via the QR factorization. The component $f_n$ is computed via a least-squares (LS) solution to (10) instead of using the closed-form expression of (11).

Another embodiment of the present invention is a method of determining a linear inference with minimal gradient. In step one, the input is obtained. The input includes sampling matrix H, measurement vector g. In step two, a projection into the sampling space is calculated. This calculation includes solving for a solution f* to the underdetermined system of equations. In step three, a minimal gradient calculated. This calculation includes obtaining the matrix N and solving $f_n$ using the least-squares solution in (10).

3.3 Signal Inference by Statistical Characteristics

Statistical knowledge of a signal distribution is exploited in at least two ways. One is based on the Karhunen-Lo'eve transform, the other is based on conditional probabilities. The statistics are drawn from a sufficiently large data set. The data set is represented with a matrix X. The j-th column corresponds to the samples of the j-th random variable $x_j$. S is the matrix obtained from X with the mean translated to zero and the variances normalized to 1.

3.3.1 Inference Based on the KL Transform

The discrete KL-transform, also called the Hotelling transform, is determined as follows. $S=U\Sigma V^T$ is the singular value decomposition of S, where U and V are orthonormal and $\Sigma$ is diagonal and nonnegative. The diagonal elements, $\sigma_j = \Sigma(j,j)$, are referred to as the singular values of S and they are nonincreasingly ordered. The transformed variables in the transformed data Y=SV are uncorrelated and ordered with nonincreasing variances $\sigma^2_j$. This is verified by checking that $Y^T Y = \Sigma^2$ is diagonal. It is also possible to verify that the transformed variables remain zero means. The KL-transform is applied often for the so-called Principal Component Analysis (PCA) where the number of decorrelated variables with dominant variances (i.e., the principal components $Y_p$) is significantly smaller than the number of the original variables.

The samples of a source distribution $f$, with the mean shifted to zero, is represented more compressly in the principal components, $Y_p f_p$. H is designed to determine the principal components. The principal coefficients $f_p$ are then determined by the following equation $$g = (HY_p) f_p. \quad (12)$$

The system of equations in (12) is no longer underdetermined and is well conditioned, (i.e., $f_p$ can be uniquely determined and stably computed). To get the mean value of the samples, $f_m$, H is designed so that the total sum of the samples can be measured, which is feasible in many practical situations. The samples are then estimated by $Y_p f_p + f_m$.

4. Nonlinear Signal Inference

Nonlinear signal inference consists of estimating $f_\perp$ by combining the measured value of $f_\parallel$ with prior knowledge of the signal subspace $V_f$. Formally, the estimated signal is $$f_{est} = f_{\parallel est} + f_{\perp est}(f_{\parallel est}) \quad (13)$$

As discussed earlier, nonlinear inference is attractive when there exists a one-to-one mapping between $f_c$ and $f_\parallel$ even though $V_f$ is not a linear projection of $V_c$. In this case, $f_\parallel$ is completely indicative of $f_c$ and $f_{\perp est}(f_{\parallel est})$ is the point in $V_\perp$ indicated as a component of $f_c$.

The primary challenges of nonlinear inference are characterization of $V_f$, discovery of a linear mapping H such that $V_\parallel$ is indicative of $V_f$, and development of an algorithm associating each point in $V_\parallel$ with a corresponding point in $V_f$. While solutions to these challenges have been demonstrated in highly constrained situations, such as wavemeters and tracking systems, exact solutions are unavailable in general spectroscopy and imaging systems.

Specification of $f_{\perp est}(f_{\parallel est})$ is challenging because for broad natural signal classes, such as optical spectral and images, it is not possible to precisely describe $V_f$. One embodiment of the present invention is a method of overcoming this challenge using Bayesian inference. Bayesian inference is based on statistical characterization of $V_f$. Distributions for components of f given measurement states are estimated from a library of known signals. These distributions are then used to determine likely signal states given measurements from unknown signals. Bayesian inference produces an estimate corresponding to the most likely value of $f_c$ given the measurement g. System design for Bayesian inference consists of choosing H such that the most likely signal corresponds to the actual signal for a given measurement. In practice, global maximization of the probability given a measurement state is less practical.

Another embodiment of the present invention is a method using objective inference. Objective inference is based on plausibility measures of $f_{est}$. Plausibility is expressed in one or more "objective functions," $\theta(f_{est})$. Objective functions are measures of signal continuity, smoothness, or coherence. Objective inference selects $f_{\perp est}(f_{\parallel est})$ to maximize objective measures of $f_{est}$. The challenge of objective inference is to discover a mapping H and an objective function such that $f_{est}$ is a good estimate of $f_c$.

Another embodiment of the present invention is a method using graphical inference. Graphical inference constructs objective functions from empirical samples drawn from $V_f$. By constructing empirical distributions and objective measures graphical inference is viewed as an integration of Bayesian and objective methods.

5. Compressive Spectroscopy

Physical implementations of compressive sampling include but are not limited to spectroscopy, digital imaging and temporal signal analysis. A spectrometer measures a set of "spectral projections" of the form $$m[n] = \langle S(\lambda), h_n(\lambda) \rangle. \quad (14)$$

Multiplex spectroscopy under which $h_n$ corresponds to a Fourier component or a Hadamard/Walsh code is common. More generally, $h_n$ represents a filter function. Almost any real positive valued filter function can be implemented. Bipolar and complex filters are constructed from linear transformations of real positive filters.

Figure 8:
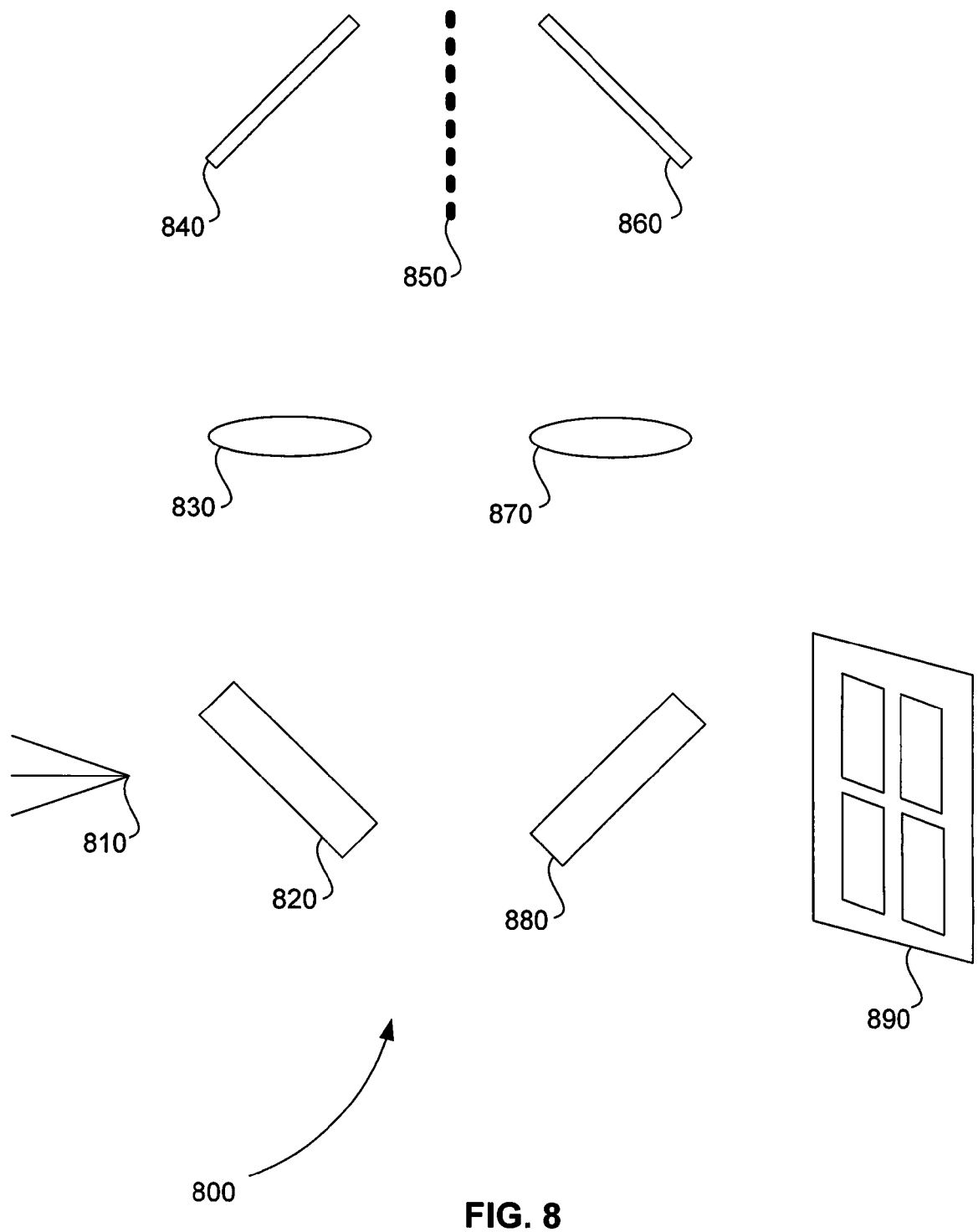
FIG. 8 is a schematic diagram of an exemplary spectrometer employing compressive sampling, in accordance with an embodiment of the present invention.

FIG. 8 is a schematic diagram of an exemplary spectrometer 800 employing compressive sampling, in accordance with an embodiment of the present invention. Spectrometer 800 includes spectral source 810, diffraction grating 820, lens 830, mirror 840, mask 850, complementary mirror 860, complementary lens 870, complementary diffraction grating 880, and detector array 890. Unknown spectral source 810 is imaged onto a slit at the input. Spectral source 810 is assumed to uniformly illuminate the slit. If spectral source 810 is a point source, a combination of cylindrical lenses can be used to expand spectral source 810 to fully illuminate the slit normal to the plane of FIG. 8 while keeping spectral source 810 focused in the plane of the FIG. 8. The input slit is imaged onto mask 850 through diffraction grating 820 or a hologram. The effect of diffraction grating 820 is to separate the image by color component. In spectrometer 800, blue is imaged at the top of the mask, green in the middle, and red at the bottom.

Mask 850 is divided into rows. Each element in a row is a filter component, modulating the color channel corresponding to the corresponding column. The modulation is by absorption, meaning that the filter weights are all positive. Negative or complex filter weights are obtained by linear weighting of the output filtered signals. When the slit is reimaged through complementary grating 880 onto output detector array 890, each element on the detector array consists of a filtered projection of the input spectrum. Since the filter function corresponds exactly to the transmittance of the mask, any filtering operation is implemented by spectrometer 800. Thus, it is possible to implement a compressive sampling scheme in spectrometer 800.

5.1 Haar-Wavelet Based Spectral Sampling

Another embodiment of the present invention is a method for compressive sampling using Haar-wavelet based spectral sampling. The target spectra consists of discrete projections $$s[n] = \left\langle S(\lambda), rect\left(\frac{\lambda - n\delta\lambda}{\delta\lambda}\right)\right\rangle \qquad (15)$$

The resolution of spectrometer 800 is δλ and there are N spectral channels. So the slits in mask 850 are designed to pass spectral signals of width δλ on to detector array 890. The slits are of discrete width so that measurements on spectrometer 800 take the form $$\overline{m}[n'] = \sum_n \sigma_{n'n} s[n] \qquad (16)$$

Using a binary masks, $\sigma_{n'n}$ assumes values 0 or 1. However, within each row (corresponding to the $n'^{th}$ measurement) any sequence $\sigma_{n'n}$ can be implemented. In another embodiment of the present invention and in order to maximize throughput, Hadamard S-Matrix codes of s[n'l] are implemented in each mask row. For example, $$s[n', l] = \sum_{n=(n'-1)l+1}^{n=n'l} s[n] \qquad (17)$$

Compressively sampled spectroscopy consists of making measurements of the form $$m[n'] = \sum_{n=1}^{l(J,N)} a_J[n', n] f a_J[n] + \sum_{j=1}^{J} \sum_{n=1}^{l(j,N)} d_j[n', n] f d_j[n] \qquad (18)$$

where $fa_J[n]$ describes the signal averages at level J using a Haar-wavelet transform, $fd_j[n]$, $1 \leq j \leq J$ describes the Haar details for levels 1 through J. In another embodiment of the present invention, the following measurements are made. At level J, $2^{-J}N$ averages are measured (i.e., $a_J[n', n]=\delta_{nn'}$). At level J, $2^{-J}N$ details are also measured (i.e., $d_J[n', n]=\delta_{nn'}$). For levels $1 \leq j < J$, $2^{-j}N$ values of sums of some permutations of details are measured, (i.e., $$d_j[n', n] = \sum_{n_p=1}^{2(J-j)} \delta_{nf(n,n_p)} \qquad$$

where $f(n,n_p)$ is a perturbation of signal positions n'>N).

Figure 9:
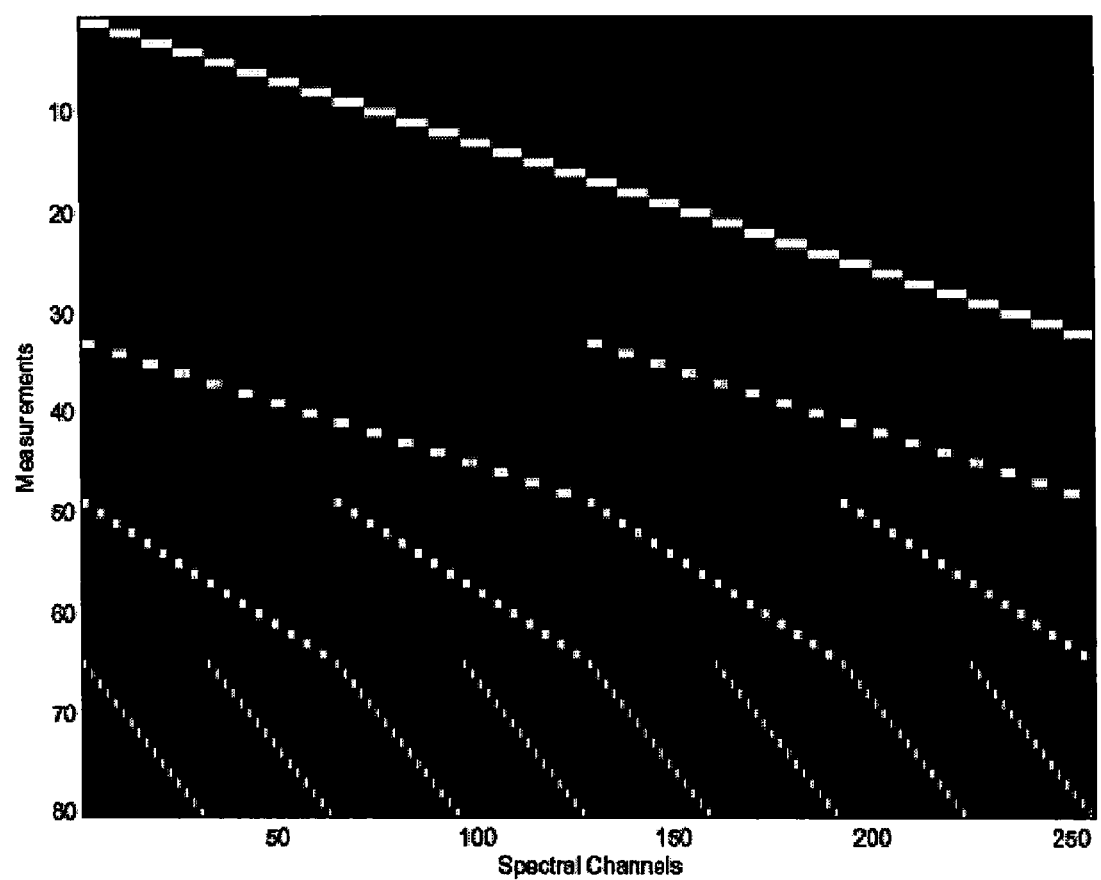
FIG. 9 is a plot of an exemplary spectral transmission mask used to make measurements on Haar-wavelet averages and details, in accordance with an embodiment of the present invention.

FIG. 9 is a plot of an exemplary spectral transmission mask 900 used to make measurements on Haar-wavelet averages and details, in accordance with an embodiment of the present invention. Mask 900 measures 256 spectral channels with just 80 measurements, implementing 31.25% compression.

Mask 900 makes measurements using a "lifting" procedure. A Haar-wavelet transform is implemented with the following direct transform:

$$A_{J+1}[n] = \frac{A_J[2n-1] + A_J[n]}{\sqrt{2}} \qquad (19)$$

-continued $$D_{J+1}[n] = \frac{A_J[2n-1] - A_J[n]}{\sqrt{2}} \qquad (20)$$

where $A_j$ and $D_j$ are the average and detail coefficients at level j. The inverse transform is given by $$A_J[2n-1] = \frac{A_{J+1}[n] + D_{J+1}[n]}{\sqrt{2}} \qquad (21)$$

$$A_J[2n] = \frac{A_{J+1}[n] - D_{J+1}[n]}{\sqrt{2}} \qquad (22)$$

Mask 900 measures all 32 average coefficients at level 3. The Haar average coefficients are the sum of spectral channels of appropriate length and scaled to an appropriate factor depending on the level. These averages at level 3 are used to find the averages and details at level 4 using the direct transform defined in Eq. (19).

For the remaining measurements, measurements of sums of combinations of details for levels 1 through 3 are made. Specifically, sums of 2 level 3 details, sums of 4 level 2 details and sums of 8 level 1 details are measured. Since averages can be easily measured with mask 900, sums of the averages at each level are measure and the sums of details are then estimated with the prior knowledge of all the parent details and parent averages.

Consider the measurement $m_j[n]$ produced by sensor n at level j given by $$m_j[n] = \alpha_j \sum_k A_j[k] \qquad (23)$$

where k includes all the averages selected by the mask for the measurement at n. From the definition of the Haar transform, the proportional factor $\alpha_j$ at level j is given by $$\alpha_j \sqrt{2^j} \qquad (24)$$

The averages at level j are related to the averages and details at Level j+1 as given in Eq. 21. Therefore, $$\frac{m_j[n]}{\alpha_j} - \sum_{k'} A_{j+1}[k'] + \sum_{k'} D_{j+1}[k'] \qquad (25)$$

where k' represents the parent averages and details corresponding to index k.

$$\sum_{k'} D_{j+1}[k'] = \frac{m_j[n]}{\alpha_j} - \sum_{k'} A_{j+1}[k'] \qquad (26)$$

The sum of the details in Eq. 26 is then assigned to each of the individual detail coefficient based on a weighting scheme. Specifically, a proportional weighting scheme is used in all the reconstructions.

Figure 10:
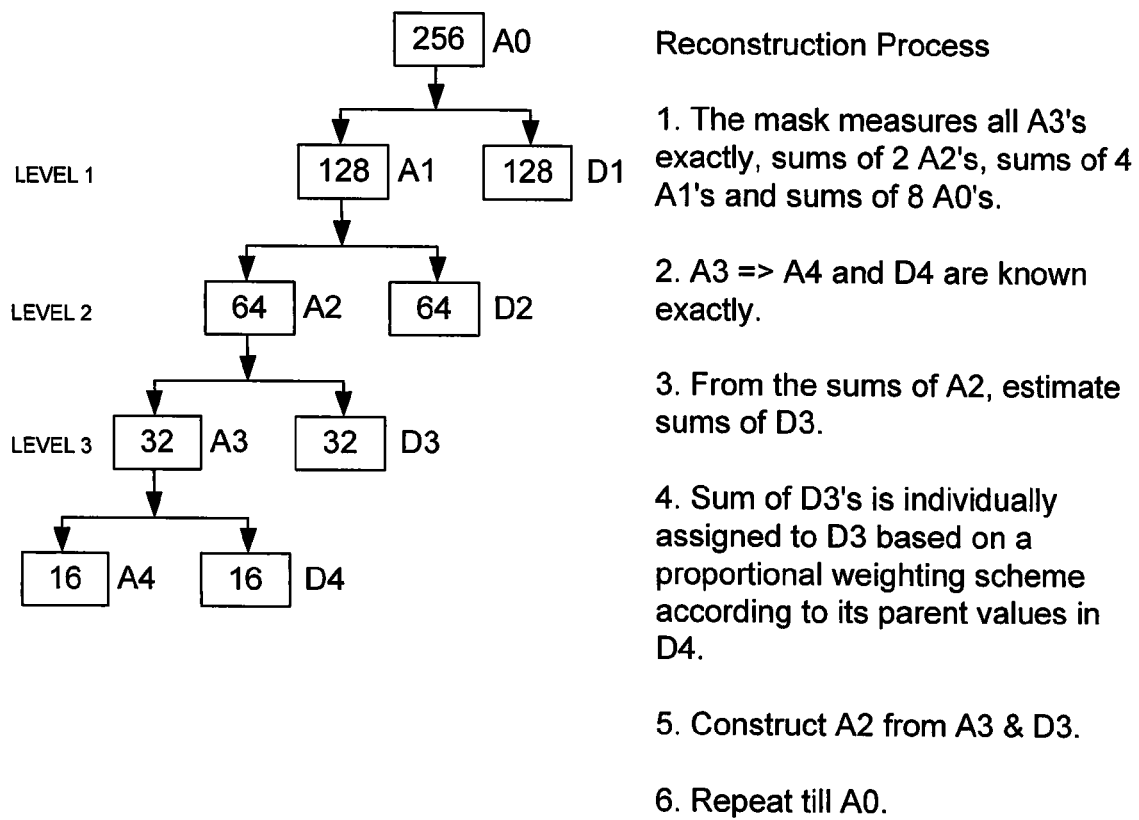
FIG. 10 is a flowchart showing an exemplary method for reconstructing Haar-wavelet averages and details for the exemplary spectral transmission mask shown in FIG. 9, in accordance with an embodiment of the present invention.

FIG. 10 is a flowchart showing an exemplary method 1000 for reconstructing Haar-wavelet averages and details for mask 900 shown in FIG. 9, in accordance with an embodiment of the present invention. Method 1000 can be used for any mask.

Figure 11:
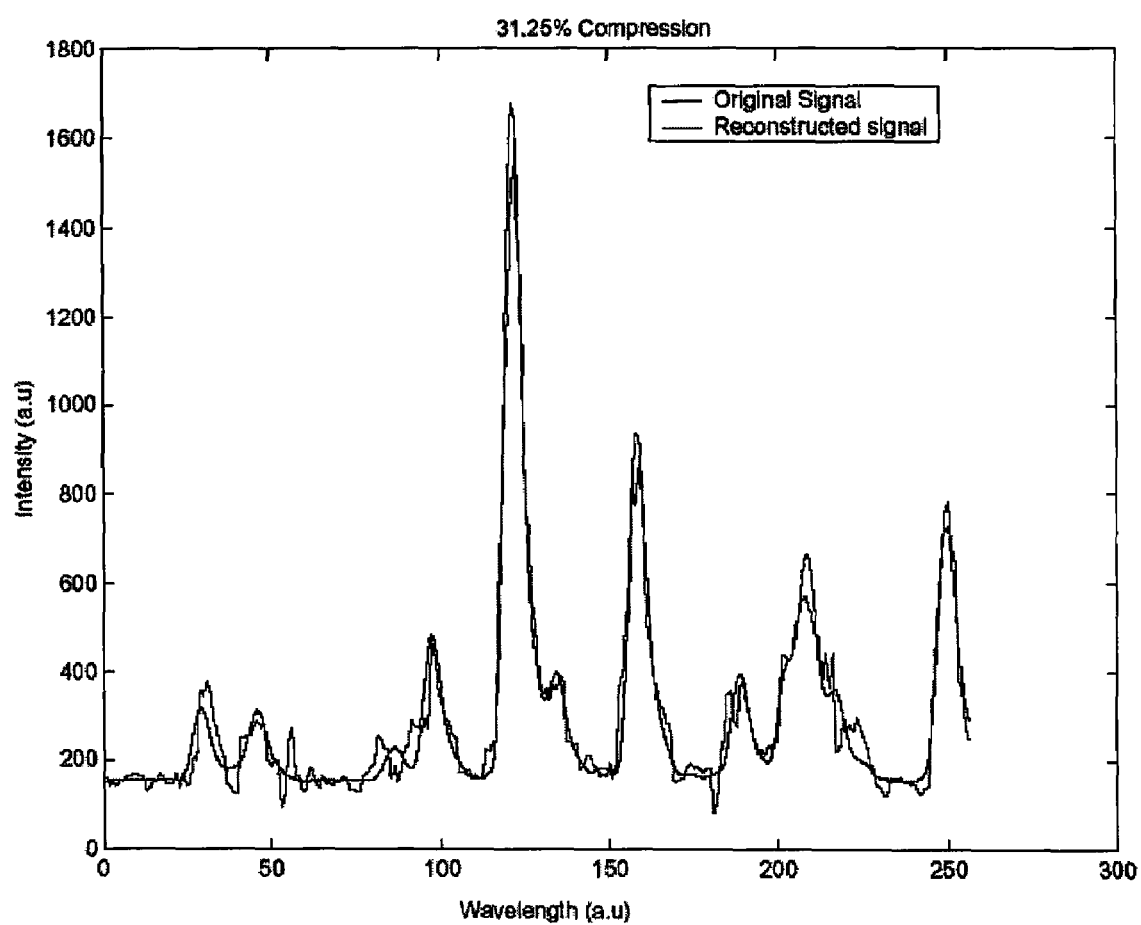
FIG. 11 is a plot of an exemplary comparison of original neon spectral data and reconstructed neon spectral data using the exemplary method shown in FIG. 10, in accordance with an embodiment of the present invention.
Figure 11:
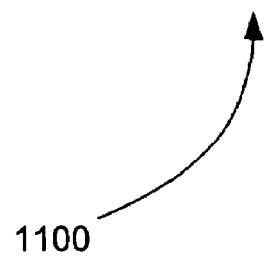

FIG. 11 is a plot of an exemplary comparison 1100 of original neon spectral data and reconstructed neon spectral data using the exemplary method 1000 shown in FIG. 10, in accordance with an embodiment of the present invention.

Figure 12:
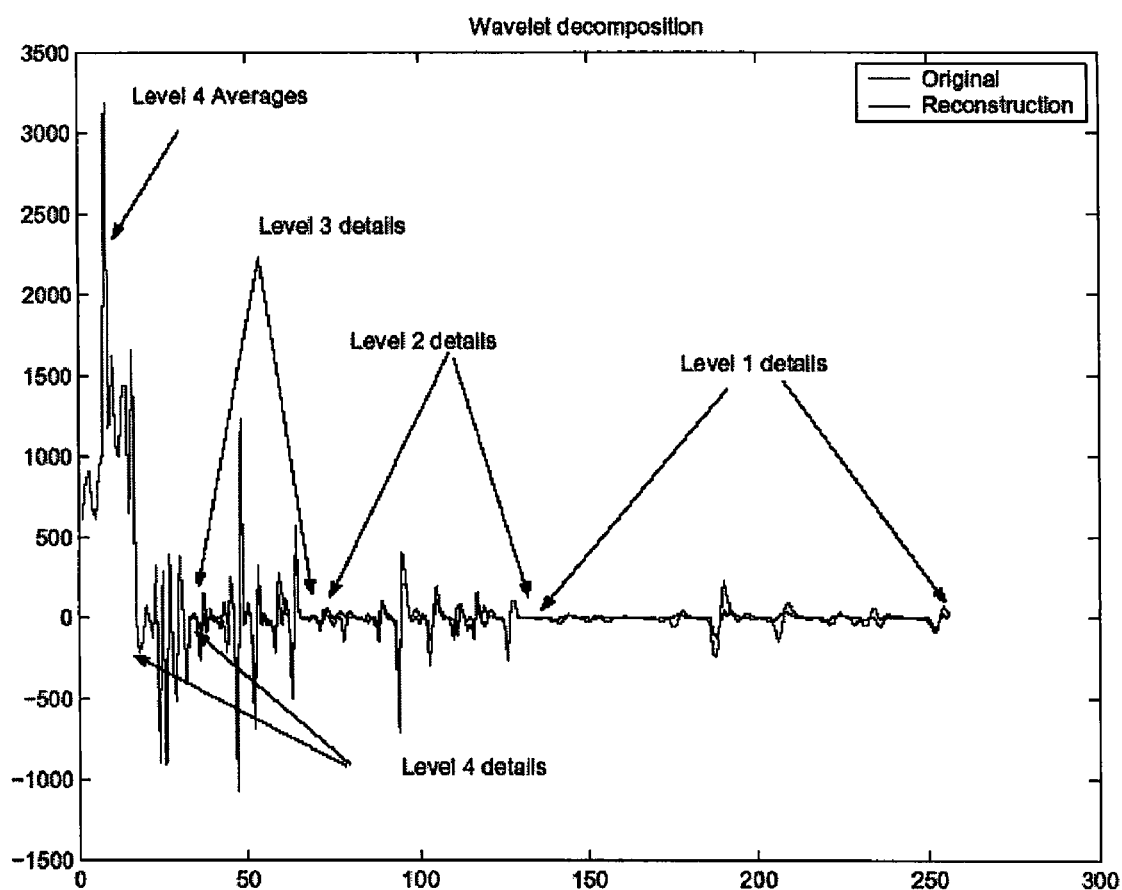
FIG. 12 is a plot of an exemplary comparison of original neon wavelet coefficient data and reconstructed neon coefficient data using the exemplary method shown in FIG. 10, in accordance with an embodiment of the present invention.
Figure 12:
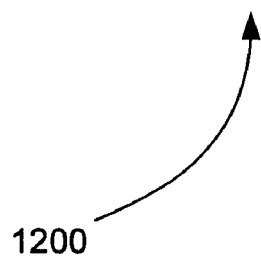

FIG. 12 is a plot of an exemplary comparison 1200 of original neon wavelet coefficient data and reconstructed neon coefficient data using the exemplary method 1000 shown in FIG. 10, in accordance with an embodiment of the present invention.

5.1 Measurement Efficient Optical Wavemeters

Another embodiment of the present invention is a multiplex optical sensor that efficiently determines the wavelength of a quasi-monochromatic source. The measurement efficient optical wavemeter is a special case of a general spectrometer based on compressive sampling in that the source is assumed to have only one spectral channel.

5.2.1 Theory

A digital optical spectrometer estimates features of the spectral density, $S(\lambda)$ of a source from discrete measurements. Measurements consist of spectral projections of the form $$m[n] = \int h_n(\lambda) S(\lambda) d\lambda, \tag{27}$$

where n is the index of the discrete array of measurements. Measurements are taken at different points in time (e.g. serially) or at different points in space (in parallel), or in some spatial and temporal combination. Measurements taken at different points in time rely on one or just a few optical detectors, with changes in the optical system accounting for variation in $h_n(\lambda)$ from one measurement to the next. Measurements taken in parallel require an array of optical detectors.

An optical wavemeter characterizes $S(\lambda)$ under a prior constraint that only one spectral channel is active. This assumption is expressed as $$S(\lambda) = \alpha \delta(\lambda - \lambda_0), \tag{28}$$

where $\alpha$ is the amplitude of the signal at $\lambda = \lambda_0$. In this case, the measurements are:

$$m[n] = \alpha h_n(\lambda_0) \tag{29}$$

The goal of the wavemeter is to estimate $\alpha$ and $\lambda_0$ from the measurements m[n]. The number of possible outcomes from the estimation process is $D_\alpha N_\lambda$, where $D_\alpha$ is the dynamic range estimated in $\alpha$, and $N_\lambda$ is the number of possible values of $\lambda_0$. The number of possible outcomes from the measurement process is $D_m^{N_m}$, where $D_m$ is the measurement of dynamic range, and $N_m$ is the number of measurements. If the sensor system is designed to achieve a one-to-one mapping between measurement outcomes and sensor outcomes, the number of measurements required is $$N_m \geq \frac{\log D_\alpha + \log N_\lambda}{\log D_m} \tag{30}$$

As an example of a maximally efficient sensor, suppose that $D_\alpha = D_m$. For a monochromatic source, $\alpha$ is measured using a single measurement with $h_1(\lambda) = 1$. $\log N_\lambda / \log D_m$ additional measurements are needed to determine $\lambda_0$. If $N_\lambda \leq \log D_m$ then only one additional measurement is needed. If $h_2(\lambda) = \kappa(\lambda - \lambda_{min})$ is selected for the second measurement, where $\kappa$ is a constant, then:

$$m[2] = \alpha \kappa (\lambda - \lambda_{min}) \tag{31}$$

$\alpha$ is already known from m[1] and the dynamic range is assumed sufficient to discriminate $N_\lambda$ spectral bins in the range from m[2]=0 to $m[2] = \alpha \kappa (\lambda_{max} - \lambda_{min})$.

While the method described by Eq. (31) shows that it is possible to build an optical wavemeter with just two measurements, it also illustrates that high dynamic range and a carefully designed and characterized sensor spectral response are necessary to achieve such efficiency. In practice, it is difficult to implement a filter-detector combination with perfectly linear spectral response. Efficient wavemeter design requires specification of both the dynamic range of the measurement system and control over the spectral responses of the measurements.

Suppose that $h_n(\lambda)$ is independently specified within each wavelength channel to a dynamic range of $D_h$. Possible values for $h_n(\lambda)$ range from 0 to $h_{n\,max}$. Assuming that the dynamic range of the measurement system is sufficient for all values of $h_n$, Eq. (29) produces $D_h^{N_m}$ different measurement states. Assuming that a has been characterized by a single measurement as before, $N_m - 1$ additional measurements characterize $\lambda_0$ if $D_h^{N_m - 1} \geq N_\lambda$, or $$N_m \geq 1 + \log_{D_h} N_\lambda \tag{32}$$

Another embodiment of the present invention is a method for achieving the limit specified in Eq. (32). The method assumes that the $N_\lambda$ possible outcomes for estimation of $\lambda_0$ are ordered and assigned indices $n(\lambda)$ such that $1 \leq n(\lambda) \leq N_\lambda$. This ordering is such that $n(\lambda)$ is monotonic in $\lambda - \lambda_{min}$, but such proportionality is not necessary and physical design constraints may make some other ordering attractive. Let d(n, l, b) be the $l^{th}$ digit of n in the base b. A filter array such that $$h_n(\lambda) = d(n(\lambda), n, D_h) \frac{h_{n\max}}{D_h} \tag{33}$$

enables characterization of $\lambda_0$ in $N_\lambda / \log D_h$ measurements. The method has been described in Eq. (31) for the case $D_h = N_\lambda$, yielding $N_m = 2$. In the more general case, comparing of Eqs. (29) and (33) it can be seen that $m[n]/(\alpha h_{n\,max})$ is the $n^{th}$ digit in the base $D_h$ representation of $n(\lambda_0)$.

Under the method described earlier, $h_n(\lambda)$ is programmed using transmission masks in a grating-based Fourier filter system. The transmittance of such masks is normally determined in a multiple step coating process. The number of transmittance values is typically $D_h = 2^{steps}$, where steps is the number of deposition steps. With 5 deposition steps, for example, Eq. (32) suggests that a 1024 channel source can be characterized using just 3 measurements. With just one deposition step, a 1024 channel source is characterized in 11 measurements.

Exemplary demonstrations of optical wavemeters for $D_h = 2$ and $D_h = 4$ are provided.

5.2.2 Design

As described above, a key step in the compressive wavemeter is the imprinting of a spatial-spectral intensity code on the source. A subsequent measurement of the spatial variation of the intensity, coupled with knowledge of the spatial-spectral code, then allows reliable estimation of the input spectrum.

Figure 13:
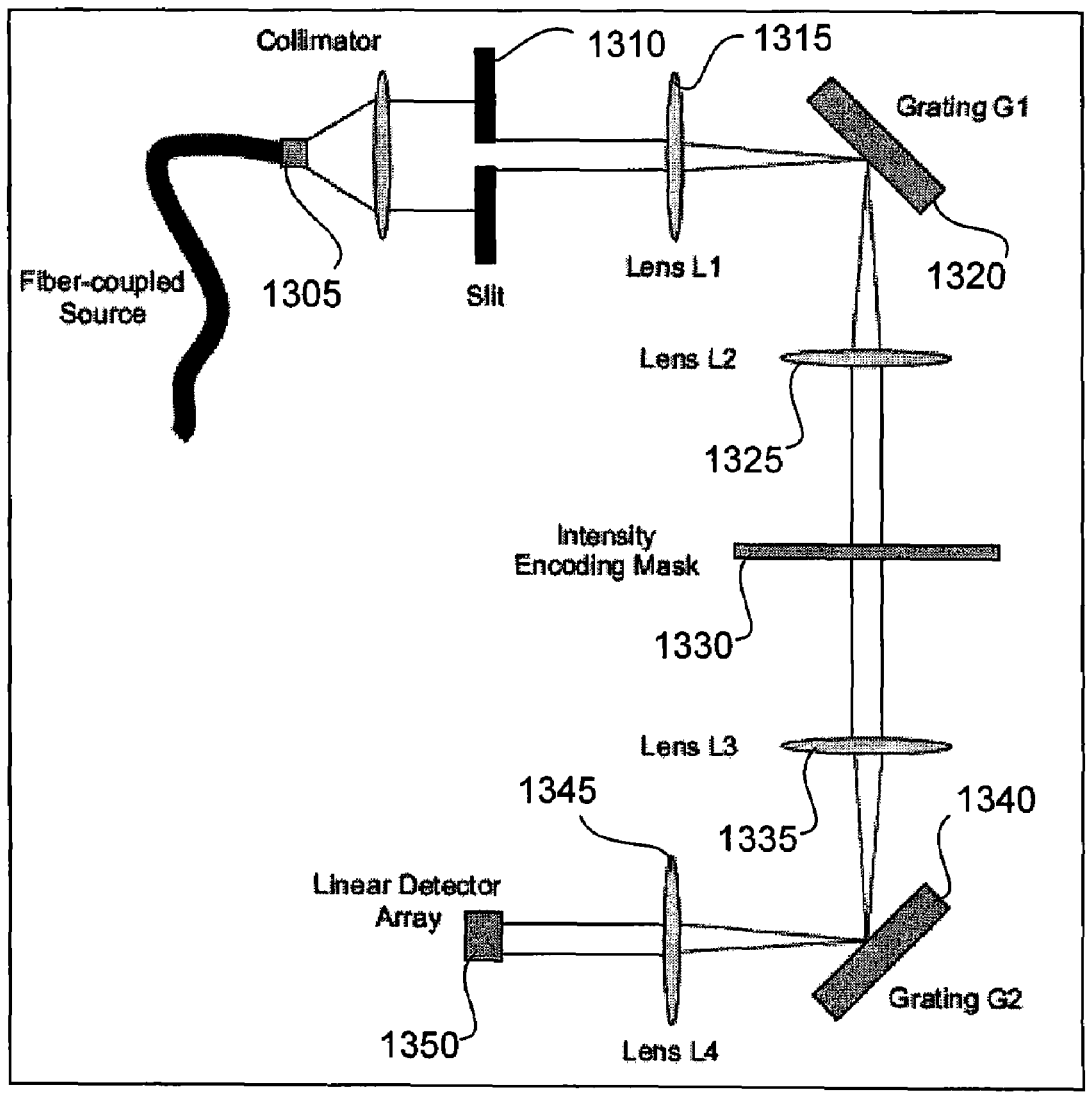
FIG. 13 is a schematic diagram showing an exemplary optical wavemeter, in accordance with an embodiment of the present invention.

FIG. 13 is a schematic diagram showing an exemplary optical wavemeter 1300, in accordance with an embodiment of the present invention. Wavemeter 1002 includes source 1305, slit 1310, lens 1315, diffraction grating 1320, lens 1325, intensity encoding mask 1330, lens 1335, diffraction grating 1340, lens 1345, and linear detector array 1350. Wavemeter 1300 utilizes a one-dimensional spatial-spectral intensity code. In other words, 1-D positional variation in intensity is produced that is a function of wavelength.

This encoding is not produced directly, but instead as the result of a three stage process. First, diffraction grating 1320 converts the spectral density of source 1305 into a spatially-varying intensity profile. Because source 1305 is monochromatic and grating 1320 is located in the center of a 4-f imaging system, this produces an image of the input slit in the image plane at a horizontal position that is wavelength dependent.

Second, mask 1330 with a 2-D pattern of transmission variations is placed in the image plane. The image of slit 1310 interacts with a narrow horizontal region of mask 1330 and is intensity-modulated by the vertical transmission pattern of mask 1330 at that horizontal location. Because the horizontal image location is wavelength dependent, a horizontal variation in the mask transmission produces different vertical intensity patterns for different spectral channels.

Finally, diffraction grating 1340 and imaging setup undo the correlation between spectral channel and horizontal position, producing a stationary image of slit 1310 regardless of wavelength. The vertical variation of intensity that was imprinted by mask 1330, however, remains. By arranging linear detector array 1350 along the vertical direction of the slit image, this intensity variation can be measured. Using the knowledge of the transmission pattern on mask 1330 and the dispersion properties of grating 1320 and grating 1340, the spectral channel of source 1305 is uniquely determined.

In another embodiment of the present invention, linear detector array 1350 is a two-dimensional array or a single element detector. In another embodiment of the present invention, the linear detector array 1350 is a base-N encoded mask and measures N levels of intensity. In another embodiment of the present invention, mask 1330 is a single element photodiode and is dynamically variable.

Another embodiment of the present invention is a method of creating transmission mask 1330. As described earlier, if it is assumed that detectors 1350 have m distinguishable output levels, then the optimal code for N spectral channels requires $1+\log_m N$ measurements. These measurements determine not only the spectral channel of the source, but also its power. (For the special case of m=2, the spectral channel alone can be determined by $\log_2 N$ measurements, but a similar reduction is not possible for other values of m.)

If N spectral channels are numbered from 1 to N, the problem then becomes isomorphic to an m-ary search tree. The k-th measurement is used to determine the k-th m-ary digit in the representation of the channel number. Thus, mask 1330 has a vertical layer for each measurement (and hence, sensor) required by the encoding. Each layer subdivides each region of the layer above into m sub-regions, each with one of m levels of transmission.

Figure 14:
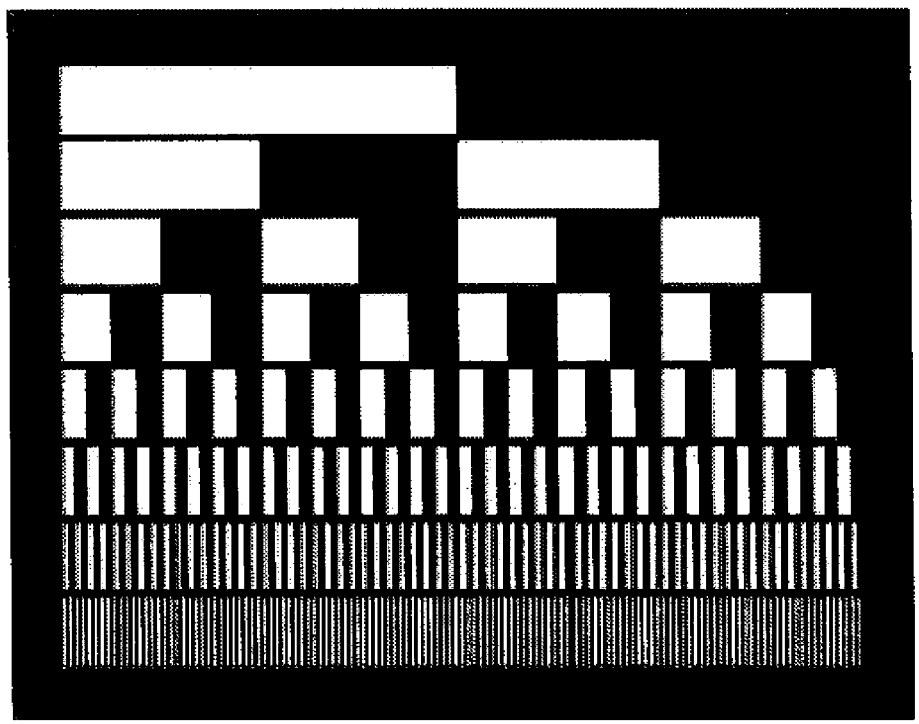
FIG. 14 is a plot of an exemplary mask for a 256-channel wavemeter with binary sensors, in accordance with an embodiment of the present invention.
Figure 14:
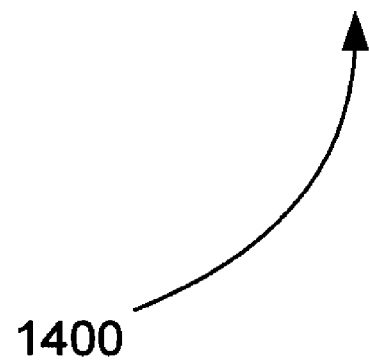

FIG. 14 is a plot of an exemplary mask 1400 for a 256-channel wavemeter with binary sensors, in accordance with an embodiment of the present invention. White regions are completely transparent, while black regions are completely opaque. Note that this is an example of the special case for m=2, where the spectral channel can be determined but not the power.

To work with non-binary sensors requires multiple levels of transparency. Producing masks with "grayscale" transparency is more difficult than producing simple binary masks. However, the finite vertical height of individual mask rows can be used to modulate the transmission to intermediate values, while still using only fully transmissive or fully opaque coatings.

Figure 15:
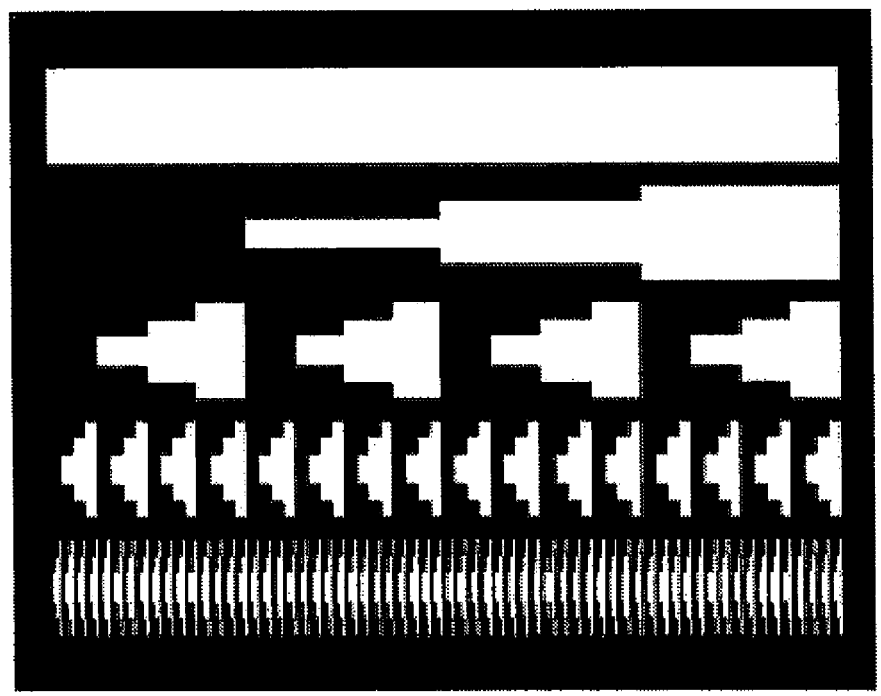
FIG. 15 is a plot of an exemplary mask for a 256-channel wavemeter with 4-level sensors, in accordance with an embodiment of the present invention.

FIG. 15 is a plot of an exemplary mask 1500 for a 256-channel wavemeter with 4-level sensors, in accordance with an embodiment of the present invention. Again, white regions are completely transmissive and black regions are completely opaque. The top line of mask 1400 provides information about the signal power, and also provides a reference level for the remaining rows.

5.2.3 Experimental Results

Another embodiment of the present invention is an exemplary method of building wavemeter 1300 shown in FIG. 13 for use with mask 1400 of FIG. 14 and mask 1500 of FIG. 15. Wavemeter 1300 has a resolution substantially equivalent to one nanometer. Mask 1400 and mask 1500 are designed to resolve 256 wavelengths with either four or eight measurements.

The resolution and the wavelength range of wavemeter 1300 is determined by the smallest feature size that can be implemented in either mask and also by the focal length 'f' of the lenses and the grating period 'Λ'. For a grating with period Λ, the primary grating equation for diffraction order m is $$\sin\theta_i + \sin\theta_d = \frac{m\lambda}{\Lambda} \tag{34}$$

where $\theta_i$ and $\theta_d$ are the incidence and diffraction angles respectively. For a given center wavelength of operation $\lambda_c$, this equation determines the operating diffraction angle at a particular incidence angle. The grating used has 600 lines per mm and the wavemeter is designed for a center wavelength of 1520 nm. With these values and for normal incidences, the diffraction angle is 65.8°.

The angular dispersion of the grating is found by differentiating Eq. 34

$$\Delta\theta_d = \frac{m\Delta\lambda}{\Lambda\cos\theta_d} \tag{35}$$

and the linear dispersion of the grating on the mask is given by $$\Delta x = f\Delta\theta_d \tag{36}$$

where f is the focal length of the lens in the 4-f imaging system. These dispersion equations determine the feature size of the masks used. A 4-f imaging system uses 50 mm focal length lenses.

An Agilent Tunable laser source 81618A, for example, is used as the input test source 1305. Laser source 1305 has an operating wavelength range of 1466-1586 nm. The range is further restricted to 1470-1570 nm (i.e., 100 channels with a 1 nm even though the masks can resolve up to 256 channels). An Indigo Systems AlphaNIR camera, for example, is used as detector array 1350. Here, the NIR camera is used as only an 8-element linear detector measuring only the intensity on each detector.

5.2.4 Binary Mask Results

Another embodiment of the present invention is wavemeter 1300 of FIG. 13 including binary mask 1400 of FIG. 14. An Agilent tunable laser source, for example, is used as the test source 1305. The output from the laser source is tuned to each of the 100 wavelengths in the 1471-1570 nm range. The fiber coupled output from the source 1305 is collimated and a vertical slit of size 25 μm is placed after the collimator. Slit 1310 is imaged on to the mask patterns of mask 1300 using a 4-f imaging system and through a diffraction grating, for example. Due to grating 1320, the slit that is imaged onto mask 1400 falls at different locations and hence gets spectrally coded differently based on the input wavelength. These patterns uniquely determine the wavelength of input source 1305.

Figure 16:
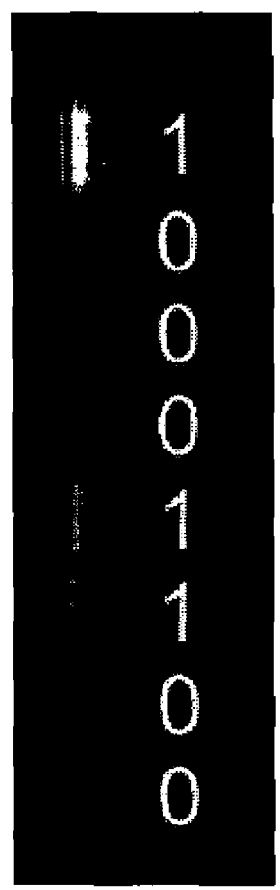
FIG. 16 is a depiction of an exemplary sample image taken using the exemplary optical wavemeter of FIG. 13 and the exemplary mask of FIG. 14, in accordance with an embodiment of the present invention.
Figure 16:
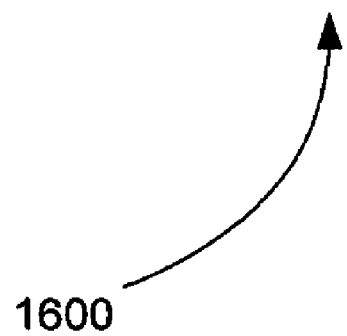

FIG. 16 is a depiction of an exemplary sample image 1600 taken using exemplary optical wavemeter 1300 of FIG. 13 and the exemplary mask 1400 of FIG. 14, in accordance with an embodiment of the present invention. For diagnostic purposes, the output plane of wavemeter 1300 is imaged rather than letting it strike linear detector array 1350. The clear representation of the bit-pattern "10001100" is seen image 1600. The analysis of the data is done by simulating the presence of a linear array in the detection plane. That is, for each simulated photodetector, a pixel region is designated in the image. Further, these regions are of identical size and shape, and are regularly spaced along a line.

Figure 17:
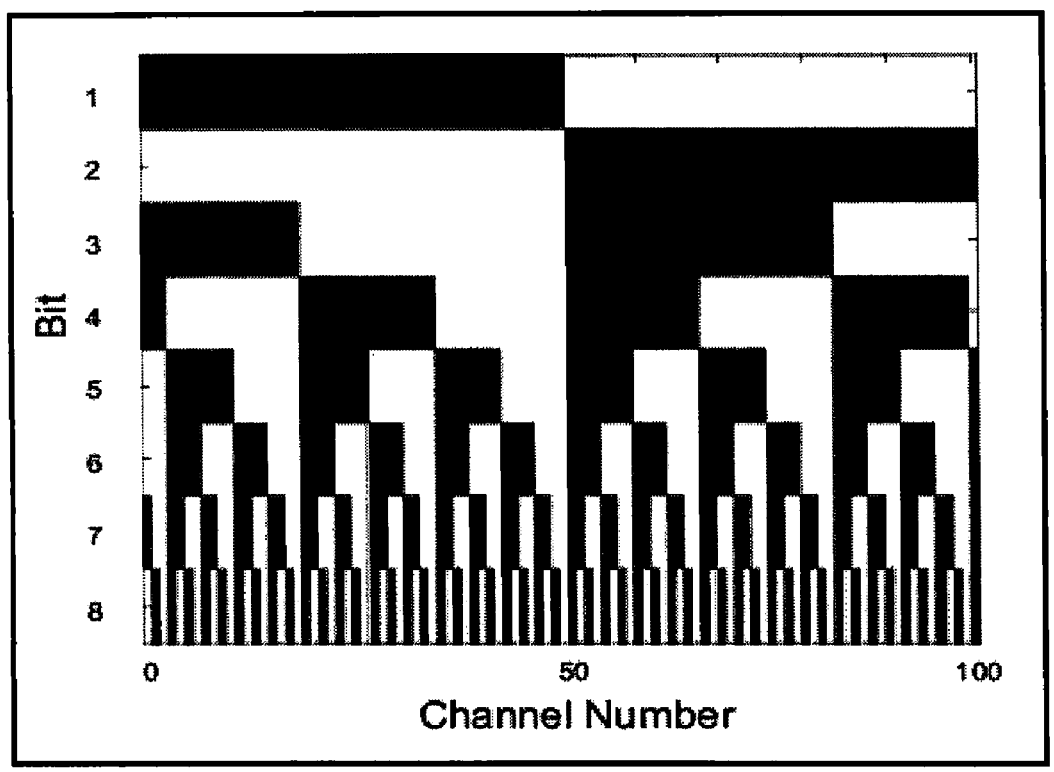
FIG. 17 is a plot of exemplary expected bit patterns for each of 100 wavelengths using the exemplary optical wavemeter of FIG. 13 and the exemplary mask of FIG. 14, in accordance with an embodiment of the present invention.

FIG. 17 is a plot of exemplary expected bit patterns 1700 for each of 100 wavelengths using exemplary optical wavemeter 1300 of FIG. 13 and exemplary mask 1400 of FIG. 14, in accordance with an embodiment of the present invention. Again, the 100 nm (1471-1570 nm) scan range is due to the limited tunability of source 1305.

Figure 18:
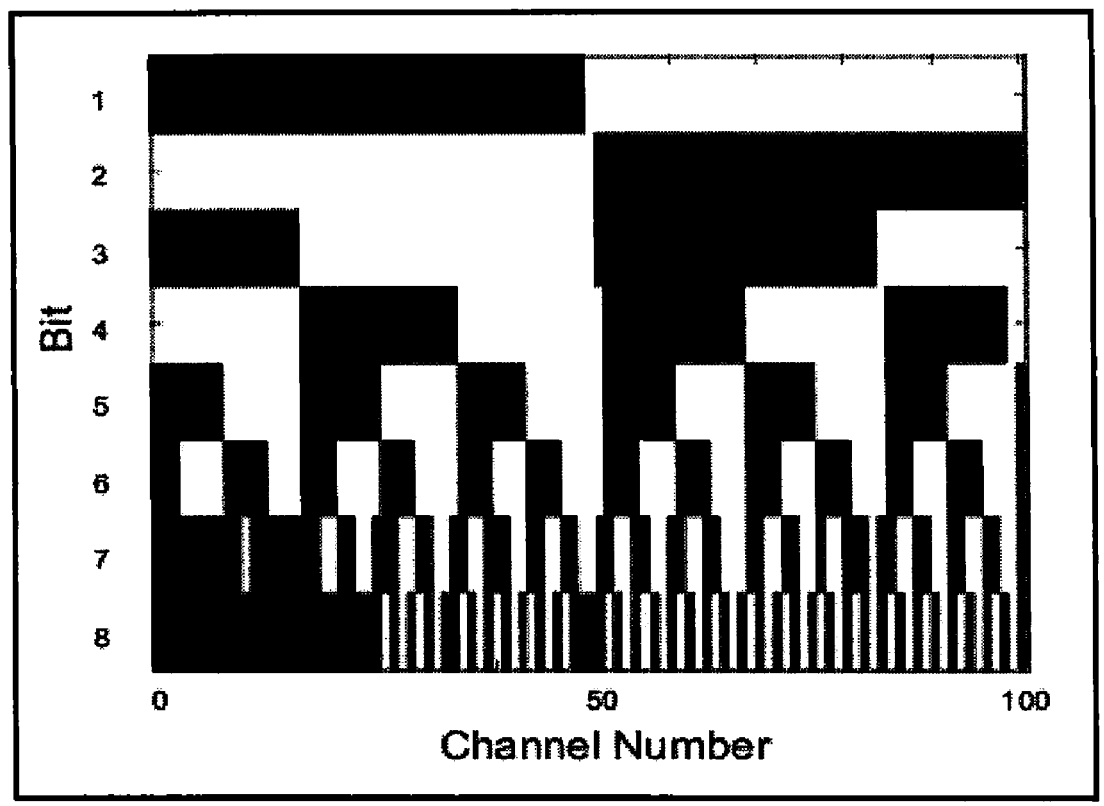
FIG. 18 is a plot of exemplary measured bit patterns for each of 100 wavelengths using the exemplary optical wavemeter of FIG. 13 and the exemplary mask of FIG. 14, in accordance with an embodiment of the present invention.

FIG. 18 is a plot of exemplary measured bit patterns 1800 for each of 100 wavelengths using the exemplary optical wavemeter 1300 of FIG. 13 and the exemplary mask 1400 of FIG. 14, in accordance with an embodiment of the present invention. The 100 wavelength channels are scanned and the bit patterns obtained on each of the 8 detector element regions on the NIR camera are measured. 82 unique patterns are observed from the measurements.

Figure 19:
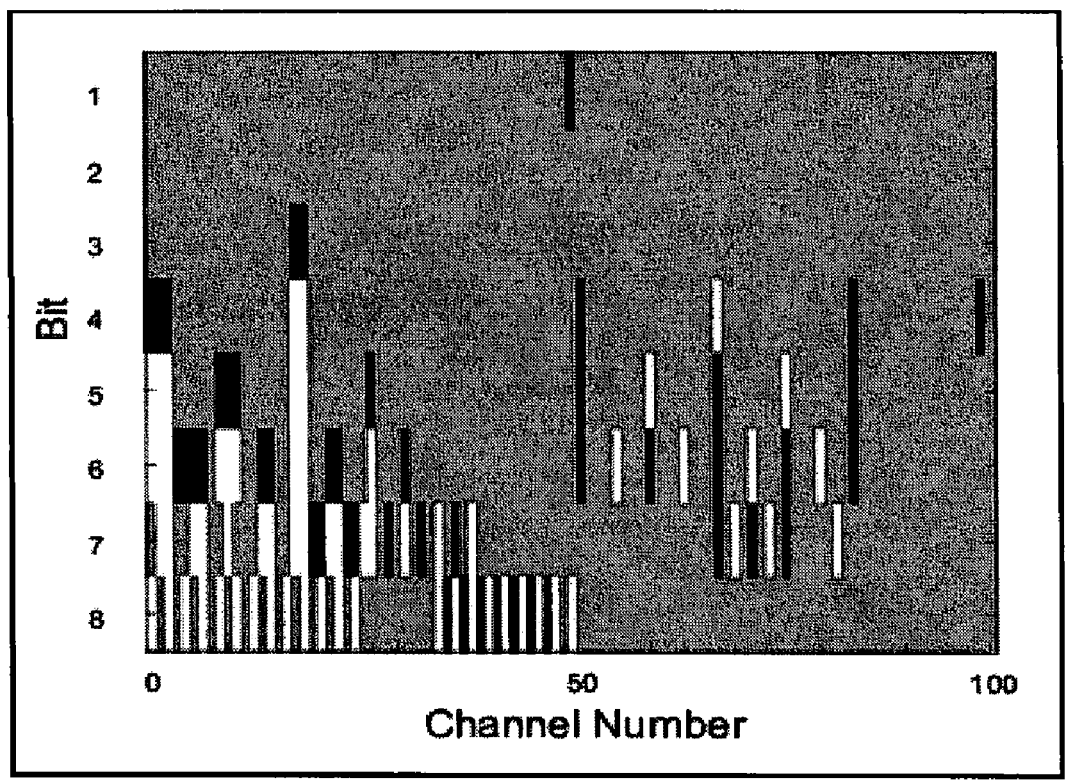
FIG. 19 is a plot of exemplary measured errors in bit patterns for each of 100 wavelengths using the exemplary optical wavemeter of FIG. 13 and the exemplary mask of FIG. 14, in accordance with an embodiment of the present invention.

FIG. 19 is a plot of exemplary measured errors 1900 in bit patterns for each of 100 wavelengths using exemplary optical wavemeter 1300 of FIG. 13 and exemplary mask 1400 of FIG. 14, in accordance with an embodiment of the present invention. Measured errors 1900 are the absolute values of the error patterns. Errors are chiefly observed in the 7th and 8th bits because of the small feature sizes involved in mask 1400. Also, some errors are caused by the well-known curvature of a slit imaged through a grating. This slight curvature is seen in image 1600 of FIG. 16 too. As a result, the light (especially in the high resolution areas of the maks) is masked as if it is in a neighboring spectral channel. These errors can be corrected in modifying mask 1400 so that it has a slight arc to match the expected curvature of the slit image.

5.2.4 Base 4 Mask Results

Another embodiment of the present invention is wavemeter 1300 of FIG. 13 including 4-level mask 1500 of FIG. 15. Mask 1500 is also designed for 256 wavelength channels. Again a laser source 1305 restricts testing only 100 wavelength channels (the 1471-1570 nm range).

Figure 20:
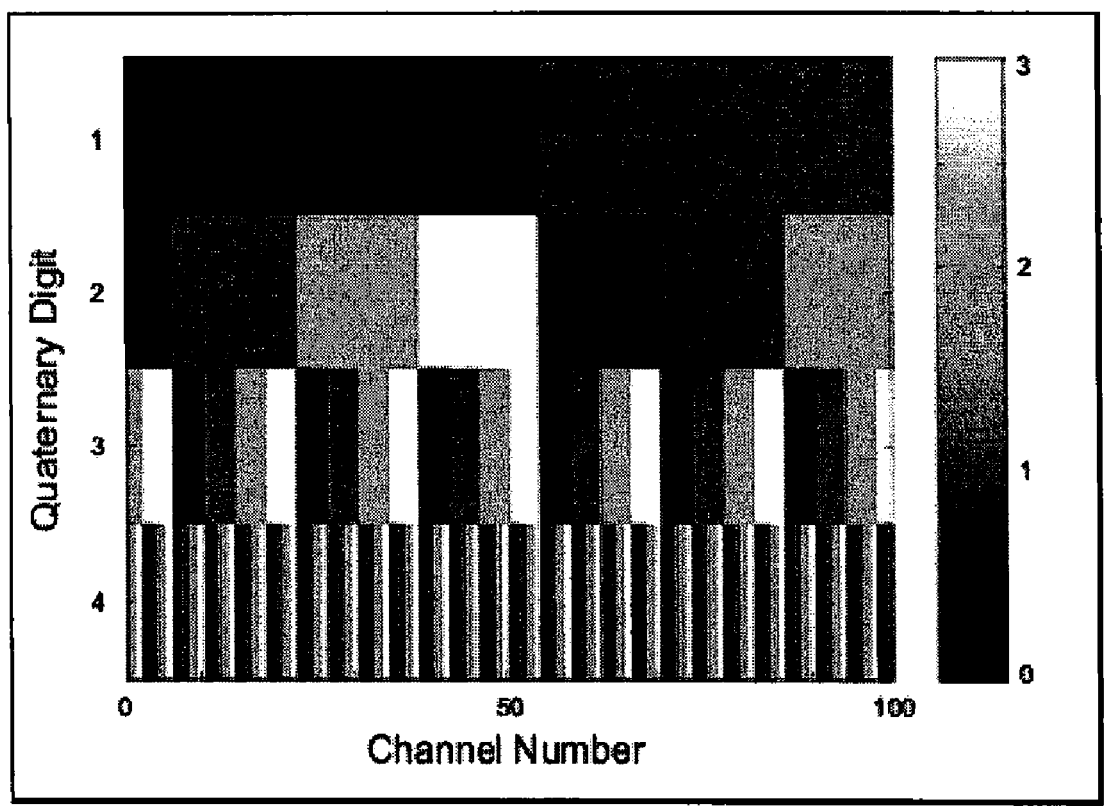
FIG. 20 is a plot of exemplary quaternary digit patterns for each of 100 wavelengths using the exemplary optical wavemeter of FIG. 13 and the exemplary mask of FIG. 15, in accordance with an embodiment of the present invention.
Figure 20:
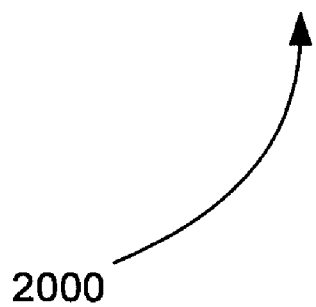

FIG. 20 is a plot of exemplary quaternary digit patterns 2000 for each of 100 wavelengths using exemplary optical wavemeter 1300 of FIG. 13 and exemplary mask 1500 of FIG. 15, in accordance with an embodiment of the present invention. Mask 1500 is a base-4 encoded mask. The values are indicated by the colorbar. The calibration row is suppressed in FIG. 20.

Figure 21:
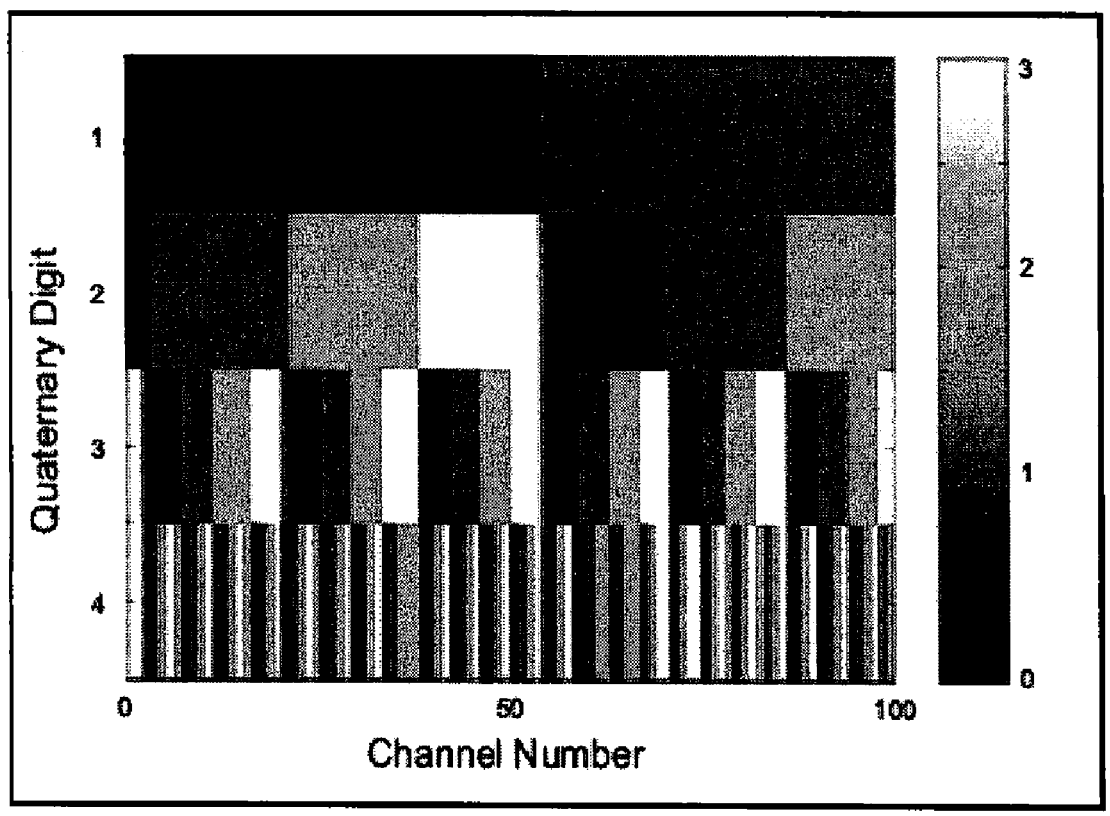
FIG. 21 is a plot of exemplary measured quaternary digit patterns for each of 100 wavelengths using the exemplary optical wavemeter of FIG. 13 and the exemplary mask of FIG. 15, in accordance with an embodiment of the present invention.

FIG. 21 is a plot of exemplary measured quaternary digit patterns 2100 for each of 100 wavelengths using exemplary optical wavemeter 1300 of FIG. 13 and exemplary mask 1500 of FIG. 15, in accordance with an embodiment of the present invention. The measured intensity at each sensor is assigned to either 3,2,1 or 0 based on a threshold relative to the total power as determined by an additional 5th sensor. The values are indicated by the colorbar. The calibration row is suppressed in FIG. 20.

Figure 22:
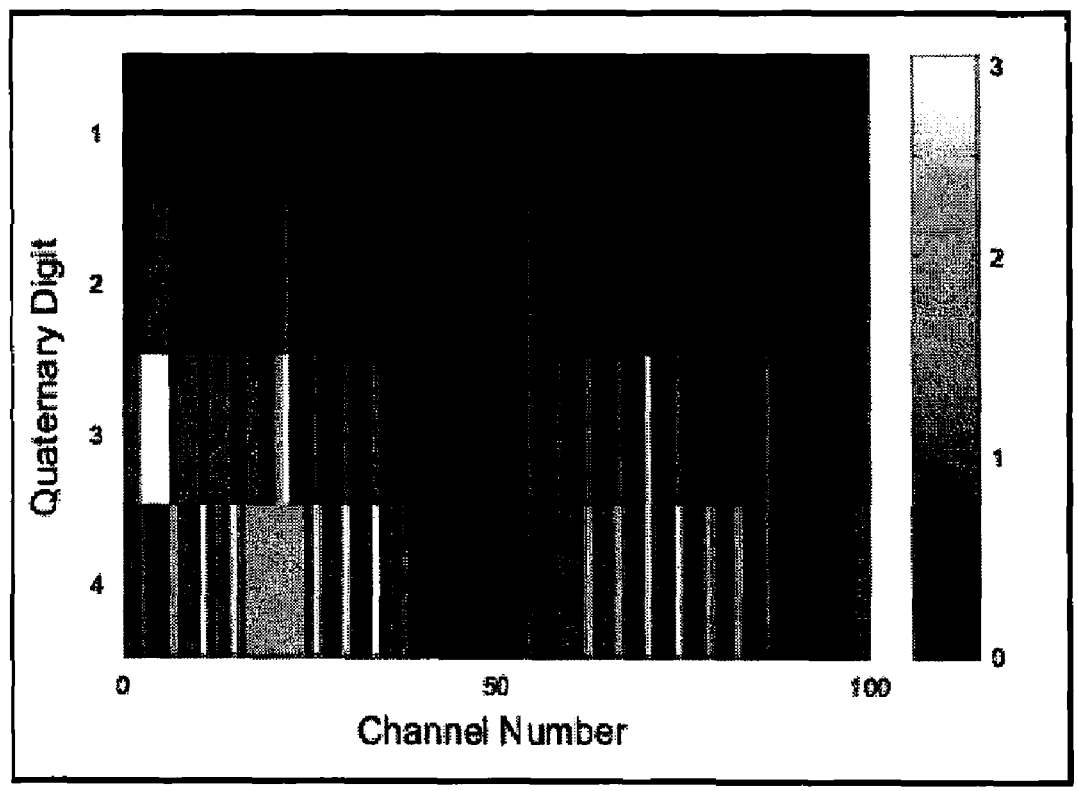
FIG. 22 is a plot of exemplary measured errors in quaternary digit patterns for each of 100 wavelengths using the exemplary optical wavemeter of FIG. 13 and the exemplary mask of FIG. 15, in accordance with an embodiment of the present invention.

FIG. 22 is a plot of exemplary measured errors 2200 in quaternary digit patterns for each of 100 wavelengths using exemplary optical wavemeter 1300 of FIG. 13 and exemplary mask 1500 of FIG. 15, in accordance with an embodiment of the present invention. Measured errors 2200 are the absolute values of the error patterns. Again measured errors 2200 are due to the curvature, which could be corrected by compensating for it in the encoding mask.

5.3 Compressive Sampling of Temporal Signals

Another embodiment of the present invention is a method for compressive sampling of a temporal signal. A temporal signal includes but is not limited to a communications signal, radio wave, or video image pixel. For a temporal signal, measurements are taken as $$m[n] = <s(t), h_n(t)>. \quad (37)$$

In this case, $h_n(t)$ is, for example, implemented electrically. Since an electrical circuit can be designed to multiply the input signal by any function $h_n(t)$, arbitrary compressive sampling is implemented for temporal signals using an electrical circuit.

Figure 23:
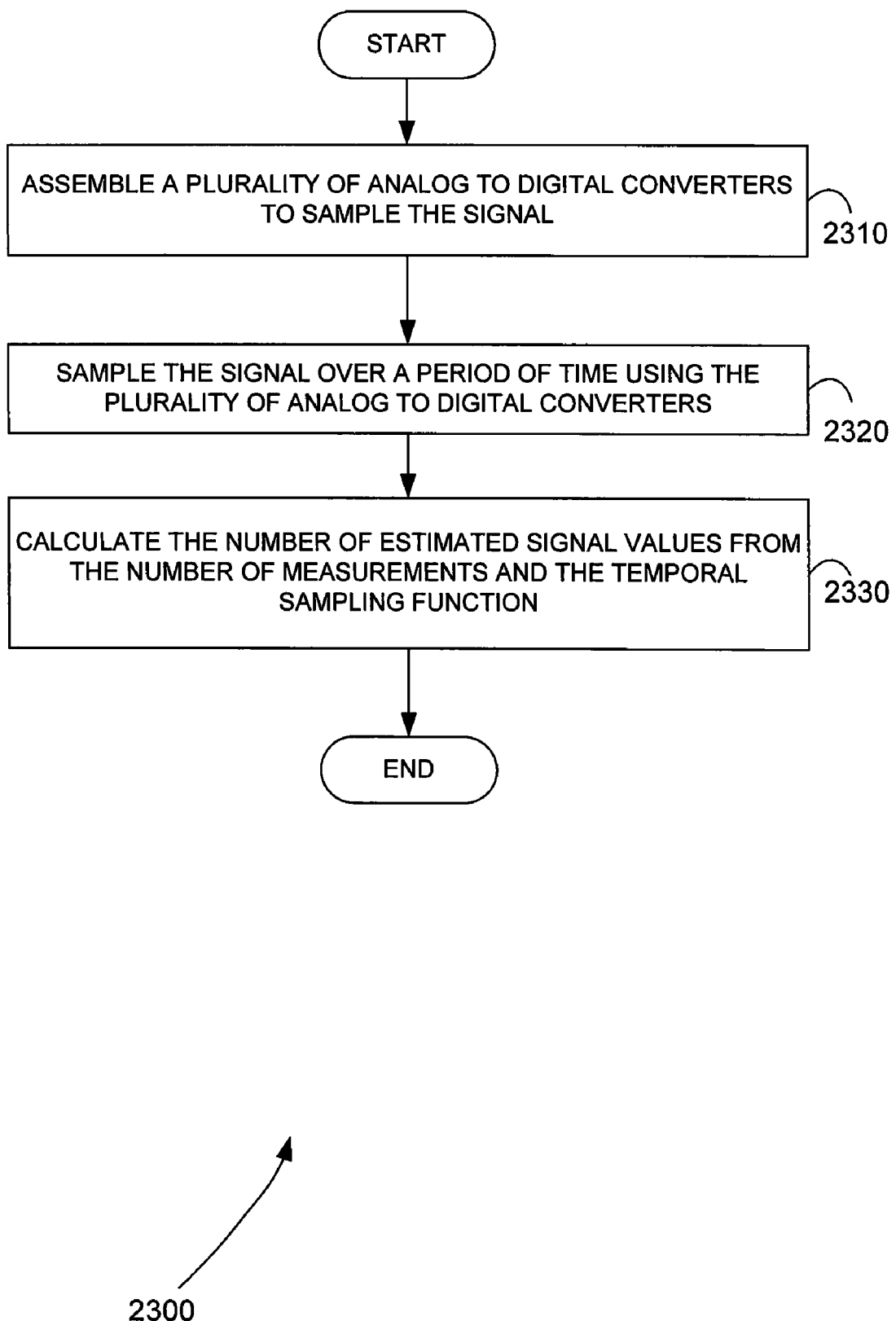
FIG. 23 is a flowchart showing an exemplary method for temporally compressively sampling a signal, in accordance with an embodiment of the present invention.

FIG. 23 is a flowchart showing an exemplary method 2300 for temporally compressively sampling a signal, in accordance with an embodiment of the present invention.

In step 2310 of method 2300, a plurality of analog to digital converters is assembled to sample the signal. Each analog to digital converter of the plurality of analog to digital converters is configured to sample the signal at a time step determined by a temporal sampling function.

In step 2320, the signal is sampled over a period of time using the plurality of analog to digital converters. Each analog to digital converter of the plurality of analog to digital converters produces a measurement resulting in a number of measurements for the period of time.

In step 2330, the number of estimated signal values is calculated from the number of measurements and the temporal sampling function. The temporal sampling function is selected so that the number of measurements is less than the number of estimated signal values.

6 Compressive Imaging

Another embodiment of the present invention is a method for compressive imaging. For an image, compressive sampling consists of measuring projections of the form $$m[n_x, n_y] = <f(x,y), h_{n_x, n_y}(x,y)>. \quad (38)$$

The challenge in an imaging system is to obtain non-local response in $h_{n_x,n_y}(x,y)$. Method for programming $h_{n_x,n_y}(x,y)$ include but are not limited to setting the shape and interconnectivity of electronic pixels on a focal plane and/or by masking pixels, replicating the input image multiple times $f(x,y)$ over redundant apertures and by sampling these resulting images with different focal plane and/or mask structures, and using optical fan-out through birefringent structures, micro-optical-mechanical devices or diffraction gratings. Through a combination of these three mechanisms and linear operations on the output samples, it is possible to implement arbitrary image sampling functions.

6.1 Background

Another embodiment of the present invention is a parallel bank of imaging systems that is used to synthesize a single global image. The primary motivating factor for this embodiment is a reduction in the form factor of the imaging system. In particular, a system consisting of N sub-apertures rather than a single coherent aperture is approximately N times thinner than a single lens system. Using compressive sampling, it is possible to also reduce the transverse area of such systems in comparison to non-encoded imagers.

More generally, focal plane coding and compressive sampling enable superior data acquisition and handling in imaging systems. Physical layer data compression reduces the data transfer requirements off of the focal plane without reducing image resolution. This may be applied in achieving imaging systems with diffraction limited image resolution without electronic sampling at the diffraction limit. Focal plane coding and compressive sampling imaging also enables superior color management, including multispectral and hyperspectral imaging at reasonable data rates. Focal plane coding and compressive sampling can also be used in developing polarization cameras. Focal plane coding and compressive sampling imaging strategies can also be applied in temporal focal plane sampling to improve data rates and light sensitivity in video imaging systems.

The focal plane is the interface between the optical field and digitized image data. The theory of analog-digital conversion across such interfaces began half a century ago with the Whitakker-Shannon sampling theorem. From the perspective of optical imaging, Whittaker-Shannon indicates that image resolution is proportional to the focal plane sampling rate. A quarter century ago, generalized sampling theory showed that it was possible to reconstruct band-limited signals by sub-Nyquist sampling of parallel multi-channel linear transformations. Many investigators have applied sampling theory to digital image super-resolution.

Focal plane coding and compressive sampling imaging is based on two improvements to digital super-resolution techniques. The first improvement is sampling function optimization. While the importance of the sampling functions to reconstruction fidelity has been clear from the origins of generalized sampling, only translation, rotation, and scale have been realized for image super-resolution.

Another embodiment of the present invention is a method of using multiplex focal plane encoding to optimize linear transformations for image reconstruction. Focal plane coding is chosen over aperture or wavefront coding, because previous experience with multiplex imaging systems has shown that for conventional imaging tasks the highest entropy measurement states are obtained from compact impulse response transformations of the focal plane. An emphasis on adaptation of imaging system design to the statistics of specific imaging tasks is outlined in the second improvement.

The second improvement is compressive sampling. Fourier-space sampling theorems assume that information is uniformly distributed across the image signal space. The success of image compression algorithms over the past decade has emphatically demonstrated that this assumption is incorrect. Recognition that image data is spatially and, in the case of video, temporally correlated on multiple scales enables dramatic compression, particularly with the development of multiscale fractal and wavelet compression bases. Using delocalized multi-scale pixel responses, focal plane coding enables direct integration of compressive coding in the image acquisition layer, thereby enabling dramatic improvements in the data and computational efficiency of digital super-resolution. Another embodiment of the present invention is an optical sensor employing compressive sampling that tracks a source over N pixels using only log(N) electronic samples.

6.2 Imaging Model

In a model conventional digital imaging system, the transformation between the optical image $f(x,y)$ and the focal plane data $g_{ij}$ is $$g_{ab}=\int\int\int p(x-a\Delta,y-b\Delta)h(x-x',y-y')f(x',y')dxdydx'dy' \quad (39)$$

where $p(x,y)$ is the pixel sampling distribution on the focal plane, $\Delta$ is the pixel spacing and $h(x,y)$ is the imaging system point spread function.

Another embodiment of the present invention is a method for measuring multiple demagnified copies of $f(x,y)$ and integrating computationally these copies into the original full resolution image. Multiple image copies are gathered by measuring the same object over multiple imaging systems, typically using a lenslet array. The final integrated signal is referred to as "the image" and the copies gathered during the measurement process are referred to as "subimages." A conventional imaging system has an aperture for collecting the field. In this embodiment the aperture is segmented into multiple "subapertures" for each subimaging system.

Measurements under this embodiment take the form $$g_{ab}^k=\int\int\int p_{abk}(x,y)h_k(x,x',y,y')f(mx',my')dxdydx'dy' \quad (40)$$

where k refers to the subimage gathered over the $k^{th}$ sub-aperture. $p_{abk}(x,y)$ is the measurement sampling function for the $ab^{th}$ pixel in the $k^{th}$ subimage. $h_k(x,x',y,y')$ is the point spread function mapping from the density at $(x',y')$ in the image to the optical intensity at $(x,y)$ on the focal plane in the $k^{th}$ subimage. In contrast with the conventional imaging system, this embodiment allows for the possibility that the pixel sampling function and the point spread functions are shift variant. Shift variance is important in creating non-redundant codes between subimages.

The subimages must be non-redundant to enable well-conditioned full resolution reconstruction of the image $f(x,y)$. Non-redundant coding between sub-images is, for example, achieved by the following mechanisms.

One mechanism involves employing image shifts. Simple shifts in the optical image relative to the focal plane from one subaperture to the next make the system weakly non-redundant. This approach is used in TOMBO imaging and similar systems. The TOMBO system demonstrates nondegenerate coding of multiple subimages but does not demonstrate compressive sampling of signal inference. Variations in the registration of the pixel sampling function relative to the subimage from subaperture to subaperture is the core of this mechanism.

Another mechanism involves using birefringent shift filters. Birefringent shift filters allow controlled and self-registering image shifts and also allow multiplexed image acquisition and reconstruction. Modulation of the point spread function from subimage to subimage is at the core of this mechanism.

Another mechanism involves using sampling masks. Sampling masks are placed in the focal plane to vary $p(x,y)$ from one sub-image to the next. Variations in the spatial structure of the pixel sampling function from subimage to subimage is at the core of this mechanism.

Another mechanism involves using microlenslet and microprism arrays. Microlenslet and microprism arrays are be used to remap the optical focal plane from subimage to subimage. This mechanism modulates the point spread function in a shift-variant manner.

Another mechanism involves using spectral and spatial filters. Spectral filters, such as gratings and Fabry-Perot and Fizeau Filters can remap the spatio-spectral pattern of the image from one sub-aperture to the next. This mechanism modulates the structure of the point spread function, typically in a chromatically varying fashion.

Another mechanism involves the physical structure of the focal plane and focal plane read dynamics. The physical structure of the focal plane and focal plane read dynamics may vary from one subimage and from one pixel to the next. This mechanism is similar to foveation. This mechanism modulates the structure of the pixel sampling function more profoundly than can be done using simple pixel masks.

Another mechanism involves using micro-optical mechanical devices. Micro-optical mechanical devices, such as deformable mirror arrays, digital light projectors, and similar dynamic elements are used to encode the optical impulse response for compressive sampling. Liquid crystal or electro-optic spatial light modulators might are similarly applied to effectively combine the functions of coding masks and micro-optical elements. Dynamic spatial light modulators are used to adapt sensor encodings to improve compressive sampling.

6.3 Coding Mechanisms

Another embodiment of the present invention is a focal plane coding and compressive sampling imaging system that measures linear transformations of an image $f(x,y)$ such that the full image is digitally reconstructed. This embodiment uses optical and electro-optical prefilters to encode the linear transformations to enable and improve the fidelity of image reconstruction.

While in some cases this embodiment is used in single aperture systems, in most cases this embodiment involves encoding over multiple subapertures. In this case, the imaging system is regarded as a filter bank and/or sampling system array.

6.3.1 Pixel Shift Coding

Another embodiment of the present invention is a method for pixel shift coding. This method can be used individually to encode images for reconstruction or can be used in combination with other methods. Pixel shift coding consists of measurement under different pixel shifts from one subaperture to the next. The measurement model for this case is $$g_{ab}^{k_x k_y} = \int\int\int p(x-a\Delta-k_x\delta, y-b\Delta-k_y\delta) h(x-x',y-y') f(Mx',My') dx dy dx' dy' \quad (41)$$

where $\delta$ is a subimage to subimage differential shift. While it is assumed here that there is a constant differential shift, the differential pixel shift, in practice, can vary nonlinearly and image rotations can also be considered from one subimage to the next.

Pixel shift coding has been previously considered by many. Some, in particular, have considered the use of pixel shift coding using multiple subimage arrays. Registration of the subimages relative to the global image coordinates has been a primary challenge for these methods. Others have focused on interpolation of full images based on self-registration using correlations between captured images.

The total pixel shift from subimage to subimage is due to shifts in the registration of the optical axis of each subaperture relative to the electronic pixel axis. If, for example, the subapertures are arranged on a Cartesian grid with uniform spacing $\Delta_{lens}$ between optical axis in both x and y, the subimage differential shift is $$\delta = \text{mod}(\Delta_{lens}, \Delta) \quad (42)$$

where mod( ) is the modulus function.

The total pixel shift from subimage to subimage is also due to shifts in the registration of the optical axis of each subaperture relative to the axis of the object. The differential shift due to the subaperture-object shift is $$\delta = \Delta_{lens} \frac{F}{R} \quad (43)$$

where F is the focal length of the imaging lenslet and R is the object range.

The object range dependent differential shift makes it difficult to implement uniform coding using pixel shifts and requires the self-registration techniques used by several authors.

The value of the differential pixel shifts critically determines the conditioning of the subimages for full image estimation. Uniformly spaced shifts spanning the range of the pixel sampling period are particularly attractive. The simplest approach to understanding image estimation for shifted pixel imagers relies on expansion of $p(x,y)$ on a finite basis. In typical systems, $p(x,y)$ is a uniform rectangular function with finite fill factor. Assuming 100% fill factor it can be assumed that $$p(x,y) = \beta^o\left(\frac{x}{\Delta}\right) \quad (44)$$

where $\beta^o( )$ is the order 0 B-spline. If $\Delta/\delta$ is an integer, the family of functions $$\phi_n(x) = \beta^o\left(\frac{x-n\delta}{\delta}\right) \quad (45)$$

spans the range of the pixel sampling functions specifically $$p(x-a\Delta-k_x\delta, y-b\Delta-k_y\delta) = \quad (46)$$

$$\sum_{n=(a-\frac{1}{2})\frac{\Delta}{\delta}+k_x+\frac{1}{2}}^{n=(a+\frac{1}{2})\frac{\Delta}{\delta}+k_x-\frac{1}{2}} \sum_{n=m=(b-\frac{1}{2})\frac{\Delta}{\delta}+k_y+\frac{1}{2}}^{n=(b+\frac{1}{2})\frac{\Delta}{\delta}+k_y-\frac{1}{2}} \phi_n(x)\phi_m(y)$$

where it is assumed that $\Delta/\delta$ is even. Defining a canonical representation for the discrete image $f_c$ as $$f_c(n,m) = \int\int\int\int \phi_n(x)\phi_m(y) h(x-x',y-y') f(Mx',My') dx dy dx' dy' \quad (47)$$

Eqn. (41) is expressed in discrete form as $$g = T f_c \quad (48)$$

where T consists of $N_{ap}^2$ submatricies, one for each subimage. Each row of T contains $(\Delta/\delta)^2$ ones and all other components are zero. Although T is not particularly well conditioned, $f_c$ is estimated by direct algebraic inversion or other methods.

A critical challenge for pixel shift methods, is that $\Delta/\delta$ is not generally an integer, in which case there is no convenient finite basis for representation of $f_c$. In this case, interpolation methods are required.

6.3.2 Birefringent Shift Coding

Another embodiment of the present invention is a method for birefringent shift coding. Birefringent coding elements having previously been used to produce coded optical fan-out. Each layer of a birefringent filter produces two orthogonally polarized copies of the incident field. It is assumed that the image field is unpolarized, although coding to estimate polarization image is also possible. The transformation with shift coding induced by a birefringent filter is $$g_{ab}^k = \int\int\int\int p(x - a\Delta, y - b\Delta) h(x - x', y - y') \sum_n f(Mx' - \delta x_{nk}, My' - \delta y_{nk}) dx\, dy\, dx'\, dy' \quad (49)$$

This transformation is equivalently expressed in terms of the Fourier transforms of the pixel sampling function P(u,v), the point spread function (PSF) H(u,v), and the intensity distribution F(u,v) as $$g_{ab}^k = \frac{1}{M^2} \int\int P(u,v) H(u,v) F\left(\frac{u}{M}, \frac{v}{M}\right) e^{-i2\pi u a\Delta} e^{-i2\pi v b\Delta} \left[\sum_n e^{-i2\pi u \delta x_{nk}} e^{-i2\pi v \delta y_{nk}}\right] du\, dv \quad (50)$$

The discrete Fourier transform (DFT) of the measured data is:

$$G_{\alpha\beta}^k = \frac{1}{N_s} \sum_{ab=0}^{N_s-1} g_{ab} e^{-i2\pi \frac{a\alpha}{N_s}} e^{-i2\pi \frac{a\beta}{N_s}} \quad (51)$$

$$= \frac{1}{N_s M^2} \int\int P(u,v) H(u,v) F\left(\frac{u}{M}, \frac{v}{M}\right)$$

$$e^{-i\pi(N_s-1)\left(\frac{\alpha}{N_s}+u\Delta\right)} e^{-i\pi(N_s-1)\left(\frac{\beta}{N_s}+v\Delta\right)} \times$$

$$\frac{\sin(\pi(\alpha + N_s u\Delta))}{\sin\left(\pi\left(\frac{\alpha}{N_s}+u\Delta\right)\right)} \frac{\sin(\pi(\beta + N_s v\Delta))}{\sin\left(\pi\left(\frac{\beta}{N_s}+v\Delta\right)\right)}$$

$$\left[\sum_{n'} e^{-i2\pi u \delta x_{n'k}} e^{-i2\pi u \delta y_{n'k}}\right] du\, dv$$

$$\approx \frac{1}{N_s M^2} \sum_{n=-\infty}^{\infty} \sum_{m=-\infty}^{\infty} P\left(\frac{n}{\Delta} - \frac{\alpha}{\Delta N_s}, \frac{m}{\Delta} - \frac{\beta}{\Delta N_s}\right)$$

$$H\left(\frac{n}{\Delta} - \frac{\alpha}{\Delta N_s}, \frac{m}{\Delta} - \frac{\beta}{\Delta N_s}\right) \times$$

$$F\left(\frac{n}{M\Delta} - \frac{\alpha}{M\Delta N_s}, \frac{m}{M\Delta} - \frac{\beta}{M\Delta N_s}\right)$$

$$\left[\sum_k e^{-i2\pi\left(\frac{n}{\Delta} - \frac{\alpha}{\Delta N_s}\right)\delta x_k} e^{-i2\pi\left(\frac{m}{\Delta} - \frac{\beta}{\Delta N_s}\right)\delta y_k}\right]$$

Assuming full fill factor rectangular pixels, $P(u,v)=\text{sinc}(u\Delta)\text{sinc}(u\Delta)$. For a diffraction limited imaging $H(u,v)=\beta^1(u\lambda/2\text{N.A.}, u\lambda/2\text{N.A.})$, where N.A. is the numerical aperture. $\beta^1$ is the first order B-spline.

Assuming that $\alpha$ and $\beta$ are limited to $[0, N_s-1]$, $H(u,v)$ is nonvanishing in the sum of Eqn. (51) for:

$$n \leq \frac{\alpha}{N_s} + \frac{2\Delta \text{N.A.}}{\lambda} \quad (52)$$

$$m \leq \frac{\beta}{N_s} + \frac{2\Delta \text{N.A.}}{\lambda}$$

This means that approximately $$N_{sub} = 4\left(\frac{\Delta \text{N.A.}}{\lambda}\right)^2$$

independent samples of F(u,v) are multiplexed in each Fourier sample. Ideally, $N_{sub}$ copies of the image are sampled with different birefringent shifts to invert and reconstruct.

In the simplest case, it is assumed that just two shifted copies of the image in each subaperture. In this case, $$\left[\sum_k e^{-i2\pi\left(\frac{n}{\Delta} - \frac{\alpha}{\Delta N_s}\right)\delta x_k} e^{-i2\pi\left(\frac{n}{\Delta} - \frac{\alpha}{\Delta N_s}\right)\delta y_k}\right] = \quad (53)$$

$$\cos\left(2\pi\left(\frac{n}{\Delta} - \frac{\alpha}{\Delta N_s}\right)\delta x_k + 2\pi\left(\frac{m}{\Delta} - \frac{\alpha}{\Delta N_s}\right)\delta y_k\right)$$

The set of measurements over the subapertures of $$F\left(\frac{n}{M\Delta} - \frac{\alpha}{M\Delta N_s}, \frac{m}{M\Delta} - \frac{\beta}{M\Delta N_s}\right)$$

is a DCT of Fourier coefficients over the range of n and m. Ideally inversion of this DCT requires $$\delta_x = \frac{n'\Delta}{\sqrt{N_{sub}}} \quad (54)$$

$$\delta_y = \frac{m'\Delta}{\sqrt{N_{sub}}}$$

where (n',m') is the subaperture index.

The pixel shift coding can be analyzed by similar Fourier methods. However, birefringent coding offers several improvements over pixel shift coding. In particular, birefringent shifts are coded by setting the thickness and orientation of a birefringent plate. Birefringent fan-out can be programmed at the tolerances required for this application. Exact coding of shifts has not been demonstrated to the same tolerance.

Also, birefringent shifts are self-registering. The challenge of shift coding is that the shift is object range dependent and alignment dependent. Subimage shifts in a birefringently coded system cause a global phase shift on the subimage Fourier transform. Given known constraints on the image (i.e., it is real and nonnegative), previous studies have shown that the image can be recovered from the magnitude of its Fourier transform. Thus, one algorithm can eliminate shift variance by considering $|G_{\alpha\beta}^k|$. This system still contains the cosine transform of the modulus of F(u,v). In the birefringent coding case, the image is coded against its own reference.

6.3.3 Transmission Mask Coding

Another embodiment of the present invention is a method for birefringent shift coding. The transformation for coding with a focal plane mask is:

$$g_{ij} = \int \int t(x,y) p(x-i\Delta, y-j\Delta) h(x-x', y-y') f(mx', my') dxydx'dy' \quad (55)$$

The idea of coding with a mask is to select t(x,y) such that the linear transformation is well-conditioned for conventional or compressively sampled reconstruction.

6.3.3 Microoptic, Diffractive, and Interferometric Coding

While birefringent coding offers the simplest and least dispersive approach to optical prefiltering focal plane coding and compressive sampling encoding, micro-optical elements, such as lenslets, diffractive elements and prisms, can be used to reshape the impulse response in a coded manner for compressive or non-compressive imaging. Interferometers in the optical path, including Fabry-Perot, Fizeau and Mach-Zender devices, can also code the impulse response.

Another embodiment of the present invention is a method for optical prefilter encoding. The basic form of the transformation for optical prefilter encoding is $$g_{ij}^k = \int \int p(x-i\Delta, y-j\Delta) h_k(x,x',y,y',\lambda) f(mx',my',\lambda) dxdydx'dy'd\lambda \quad (56)$$

with the basic point being that the point spread function is not shift invariant and that it is non-redundantly coded in each subaperture. The possibility that the point spread function is dispersive (wavelength dependent) is also include.

Wavelength dispersion is both a challenge and an opportunity. In cases for which one is more interested in the achromatic image, wavelength dispersion can decrease signal to noise by binning light from similar spatial location in different detection channels. In cases where one is interested in multispectral or hyperspectral images, wavelength dispersion offers an opportunity to create a coded cross-spectral measurement system.

Temporal variations and adaptation in the optical prefilter is another possibility with micro-optical signal encoding. Using a spatial light modulator, such as a micromirror array, a liquid crystal or acoustic modulator, it is possible to vary $h_k(x,x',y,y',\lambda) f(mx',my',\lambda)$ as a function of time. This can be used to implement time domain compressive sampling or to match the PSF to the image signal.

6.4 Focal Plane Coding

Another embodiment of the present invention is a method for focal plane coding. A focal plane is an array of electronic detectors. In typical applications the array has a grid of rectangular pixels. Rectangular pixels are particularly appropriate for, for example, charge coupled device based detectors (CCDs). Other electronic detectors include active pixel CMOS VLSI detector arrays. In infrared systems, CMOS or CCD systems are used for the backend or front-end detector array.

Using CMOS detectors, microbolometer, or other detector arrays it is possible to shape both the spatial distribution of pixel sampling functions and the temporal read-out circuit for compressive sampling. The focal plane modulated image to measurement mapping is $$g_{ij}^k(t) = \int \int p_k(x-i\Delta, y-j\Delta, t) h(x-x', y-y') f(mx', my') dxdydx'dy' \quad (57)$$

The possibility of temporal variations is included in the pixel sampling function. This constitutes temporal variation in the read-out rate and read-out filter from different pixels rather than temporal changes in the spatial structure.

Generalized filtering in the temporal read-out circuit enables compressive sampling in time as well as space. From a spatial perspective, the lay-out of the pixel sampling structure achieves the same advantages as a transmission mask without masking. In addition, however, electronic interconnections and space-time filtering enable focal planes to implement non-convex, disjoint and multiscale pixel sampling functions that can be difficult to achieve with simple mask sampling.

Figure 24:
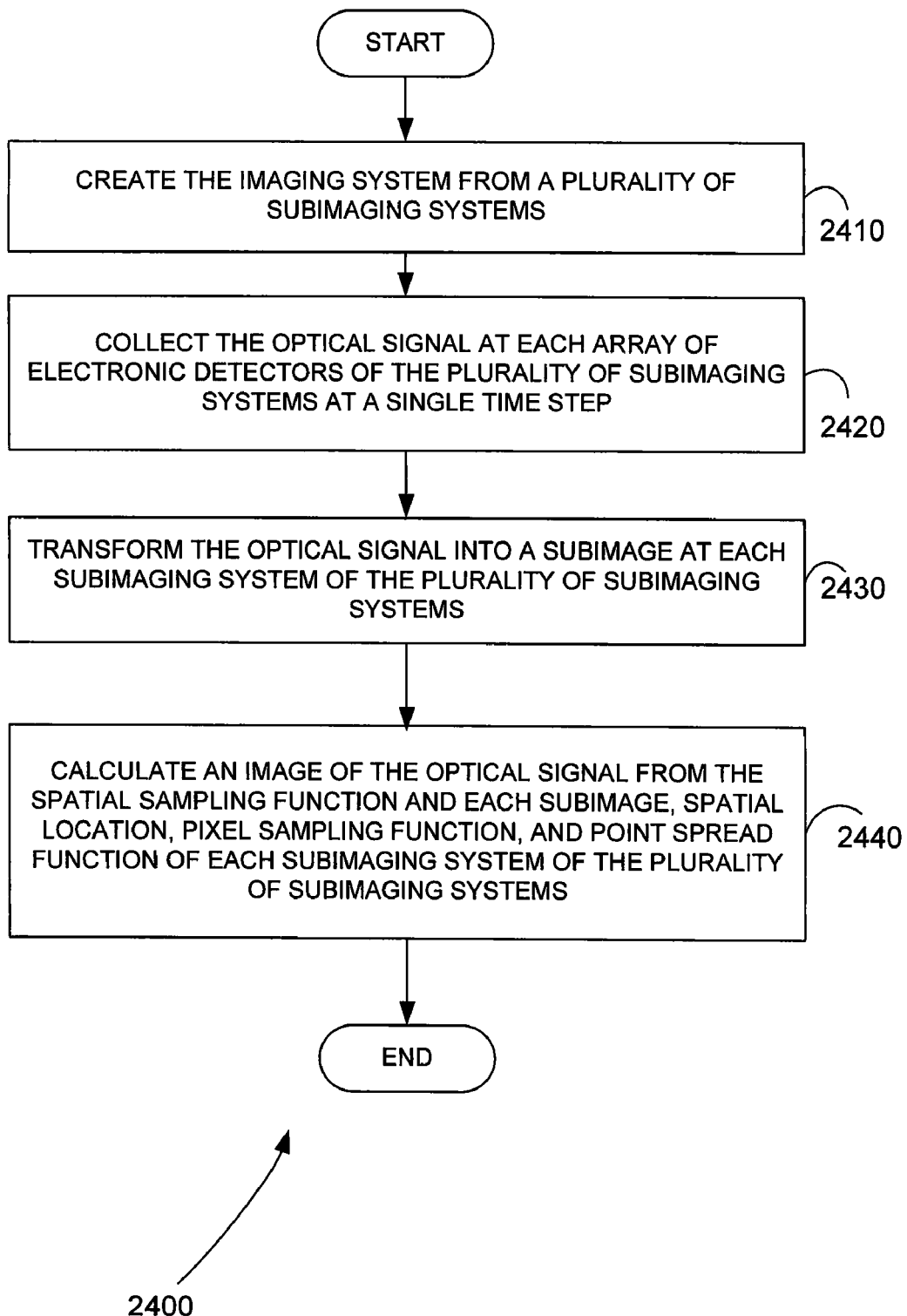
FIG. 24 is a flowchart showing an exemplary method for spatially focal plane coding an optical signal using an imaging system, in accordance with an embodiment of the present invention.

FIG. 24 is a flowchart showing an exemplary method 2400 for spatially focal plane coding an optical signal using an imaging system, in accordance with an embodiment of the present invention.

In step 2410 of method 2400, the imaging system is created from a plurality of subimaging systems. Each subimaging system includes an array of electronic detectors. Each subimaging system is dispersed spatially with respect to a source of the optical signal according to a sampling function.

In step 2420, the optical signal is collected at each array of electronic detectors of the plurality of subimaging systems at a single time step.

In step 2430, the optical signal is transformed into a subimage at each subimaging system. The subimage includes at least one measurement from the array of electronic detectors of the subimaging system.

In step 2440, an image of the optical signal is calculated from the sampling function and each subimage, spatial location, pixel sampling function, and point spread function of each subimaging system of the plurality of subimaging systems. The sampling function is selected so that the number of measurements for the plurality of subimages is less than the number of estimated optical signal values that make up the image.

Figure 25:
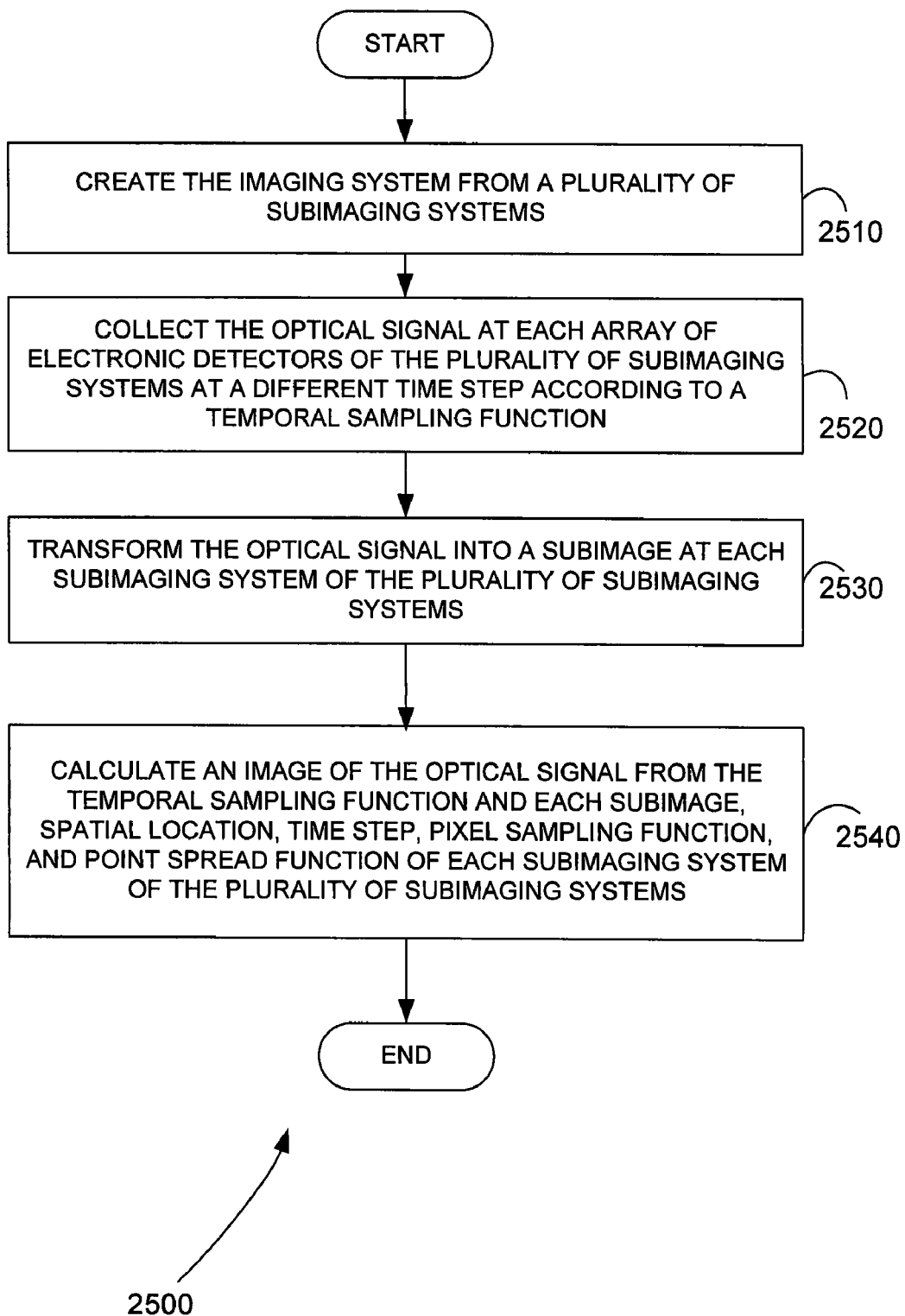
FIG. 25 is a flowchart showing an exemplary method for temporally focal plane coding an optical signal using an imaging system, in accordance with an embodiment of the present invention.

FIG. 25 is a flowchart showing an exemplary method 2500 for temporally focal plane coding an optical signal using an imaging system, in accordance with an embodiment of the present invention.

In step 2510 of method 2500, the imaging system is created from a plurality of subimaging systems. Each subimaging system includes an array of electronic detectors.

In step 2520, the optical signal is collected at each array of electronic detectors of the plurality of subimaging systems at a different time step according to a temporal sampling function.

In step 2530, the optical signal is transformed into a subimage at each subimaging system of the plurality of subimaging systems. The subimage included at least one measurement from an array of electronic detectors of each subimaging system.

In step 2540, an image of the optical signal is calculated from the temporal sampling function and each subimage, time step, pixel sampling function, and point spread function of each subimaging system of the plurality of subimaging systems. The temporal sampling function is selected so that the number of measurements for the plurality of subimages is less than the number of estimated optical signal values comprising the image.

Figure 26:
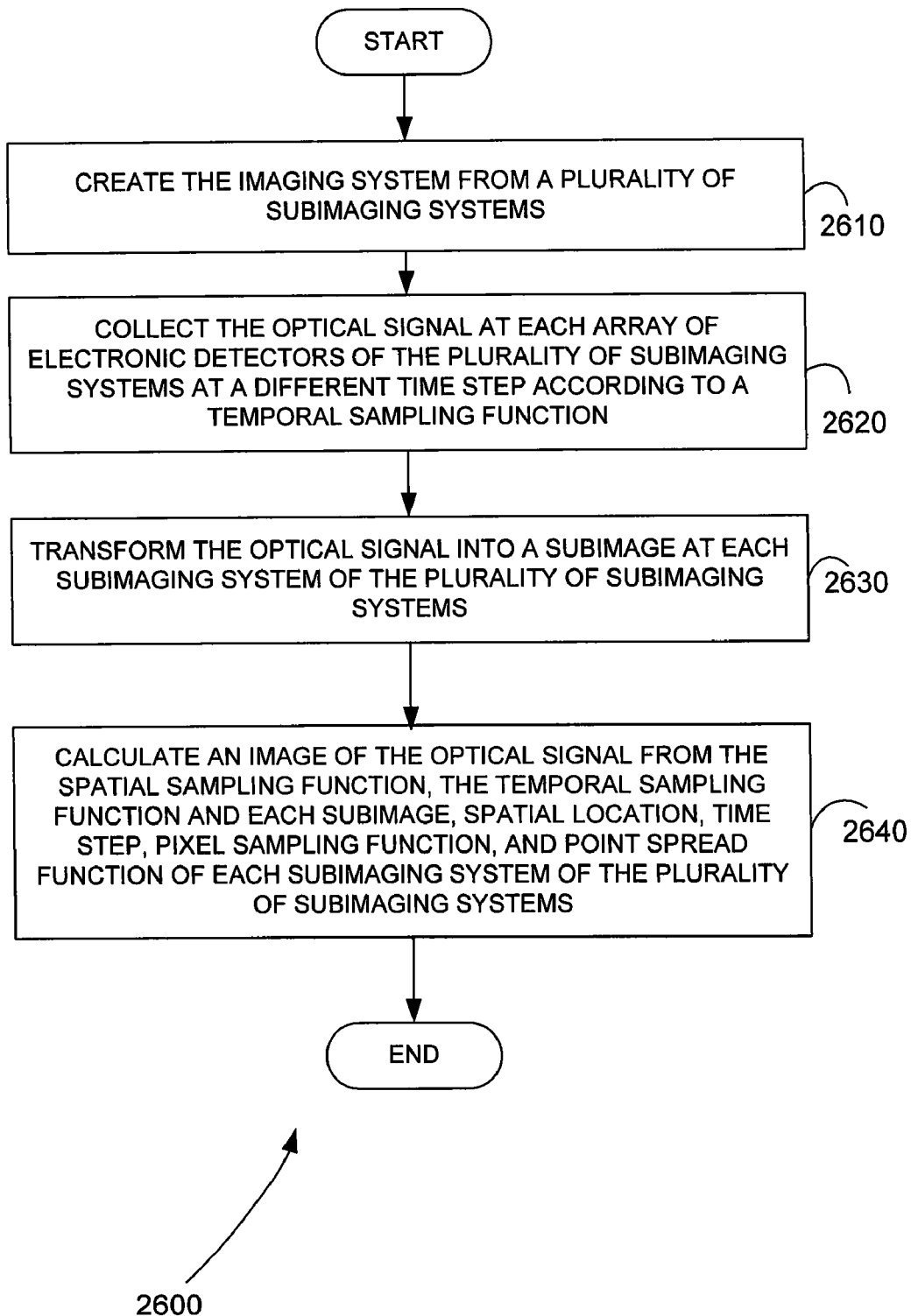
FIG. 26 is a flowchart showing an exemplary method for spatially and temporally focal plane coding an optical signal using an imaging system, in accordance with an embodiment of the present invention.

FIG. 26 is a flowchart showing an exemplary method 2600 for spatially and temporally focal plane coding an optical signal using an imaging system, in accordance with an embodiment of the present invention.

In step 2610 of method 2600, the imaging system is created from a plurality of subimaging systems. Each subimaging system includes an array of electronic detectors. Each subimaging system is dispersed spatially with respect to a source of the optical signal according to a spatial sampling function.

In step 2620, the optical signal is collected at each array of electronic detectors of the plurality of subimaging systems at a different time step according to a temporal sampling function.

In step 2630, the optical signal is transformed into a subimage at each subimaging system of the plurality of subimaging systems. The subimage includes at least one measurement from an array of electronic detectors of the each subimaging system.

In step 2640, an image of the optical signal is calculated from the spatial sampling function, the temporal sampling function and each subimage, spatial location, time step, pixel sampling function, and point spread function of each subimaging system of the plurality of subimaging systems. The spatial sampling function and the temporal sampling function are selected so that the number of measurements for the plurality of subimages is less than the number of estimated optical signal values that make up the image.

7 Dynamic and Adaptive Coding Systems

It is useful in some cases to apply dynamic, rather than static, sampling strategies in compressive sampling systems. In such cases, micro-electro-optical mechanical devices or other dynamic spatial light modulators are used to adapt sampling filters and codes.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with an embodiment of the present invention disclosed herein can advantageously reduce sensor cost, reduce sensor data load, reduce processing load, increase spatial sampling capacity and improve spatial abstraction.

For spectral bands at the edge of the visible spectrum, such as infrared, millimeter wave and ultraviolet ranges detector cost is a significant component of overall system cost. Compressive sampling enables lower system cost by reducing the detector count necessary for a given range and resolution specification.

In highly parallel sensor systems, such as imaging systems, read-out data loads may be overwhelming. Compression at the point of sampling may reduce these data loads and enable lower power, lower bandwidth sensor design.

Many sensor systems implement data compression in software immediately after sensing. Direct compression in sampling reduces or eliminates post sensor processing for data compression and analysis.

Sensor systems are limited by physical geometric constraints. Hyperspectral imagers, for example, require simultaneous sampling of myriad spatial and spectral channels. Efficient packing of sampling points requires mechanical scanning or large system apertures. Compressive sampling enables spatial and spectral sampling to be folded into smaller system volumes and shorter scanning times.

Sensor systems are based on naive isomorphisms between object and measurement spaces. The discrete abstractions of compressive sampling enable generalized models for the object space, including multidimenisional object spaces and differences between the dimensionality of the measurement and object space.

8 Multiplex and Reflective Compressing Sampling

Figure 27:
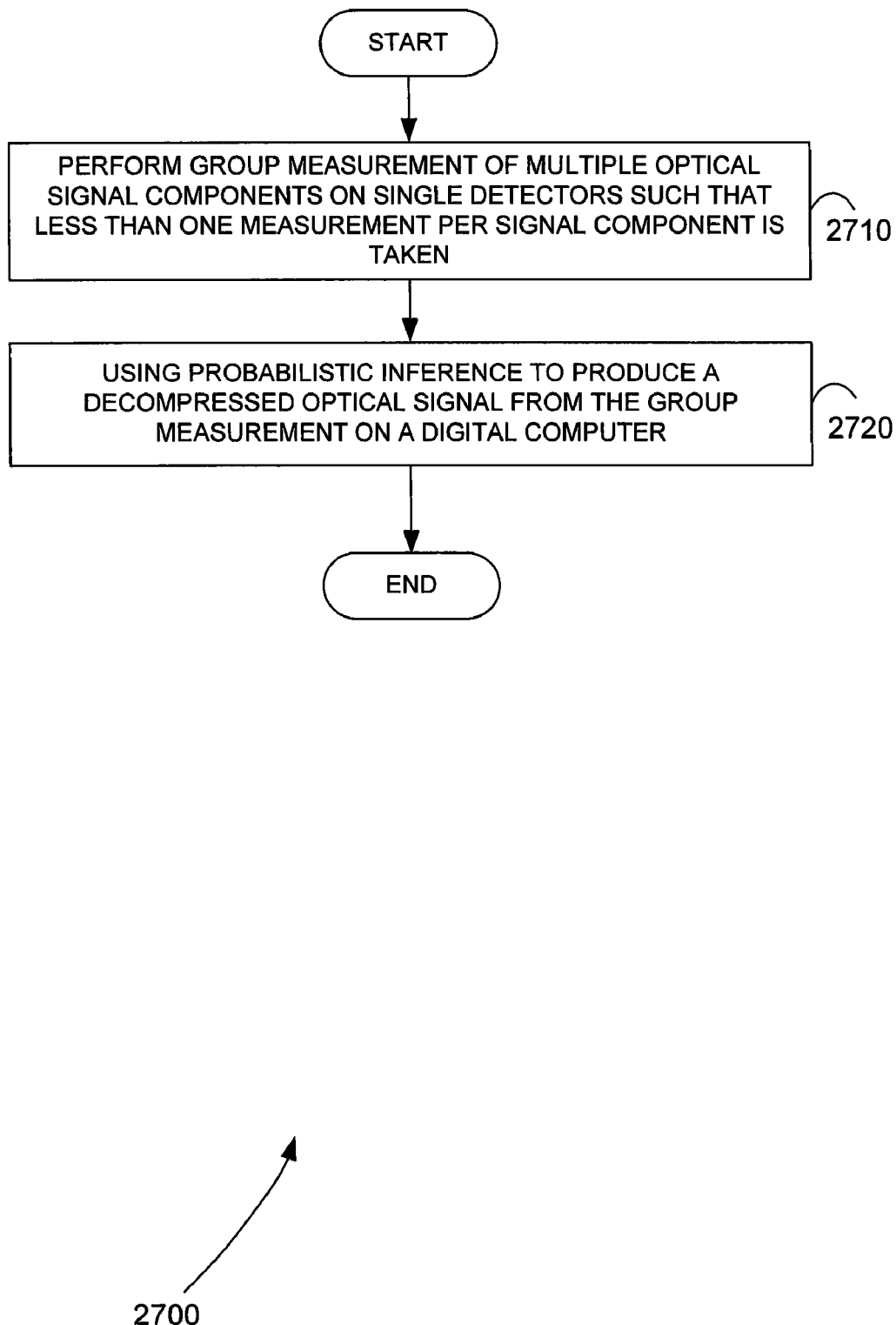
FIG. 27 is a flowchart showing an exemplary method for compressively sampling an optical signal using multiplex sampling, in accordance with an embodiment of the present invention.

FIG. 27 is a flowchart showing an exemplary method 2700 for compressively sampling an optical signal using multiplex sampling, in accordance with an embodiment of the present invention.

In step 2710 of method 2700, group measurement of multiple optical signal components on single detectors is performed such that less than one measurement per signal component is taken.

In step 2720, probabilistic inference is used to produce a decompressed optical signal from the group measurement on a digital computer.

Figure 28:
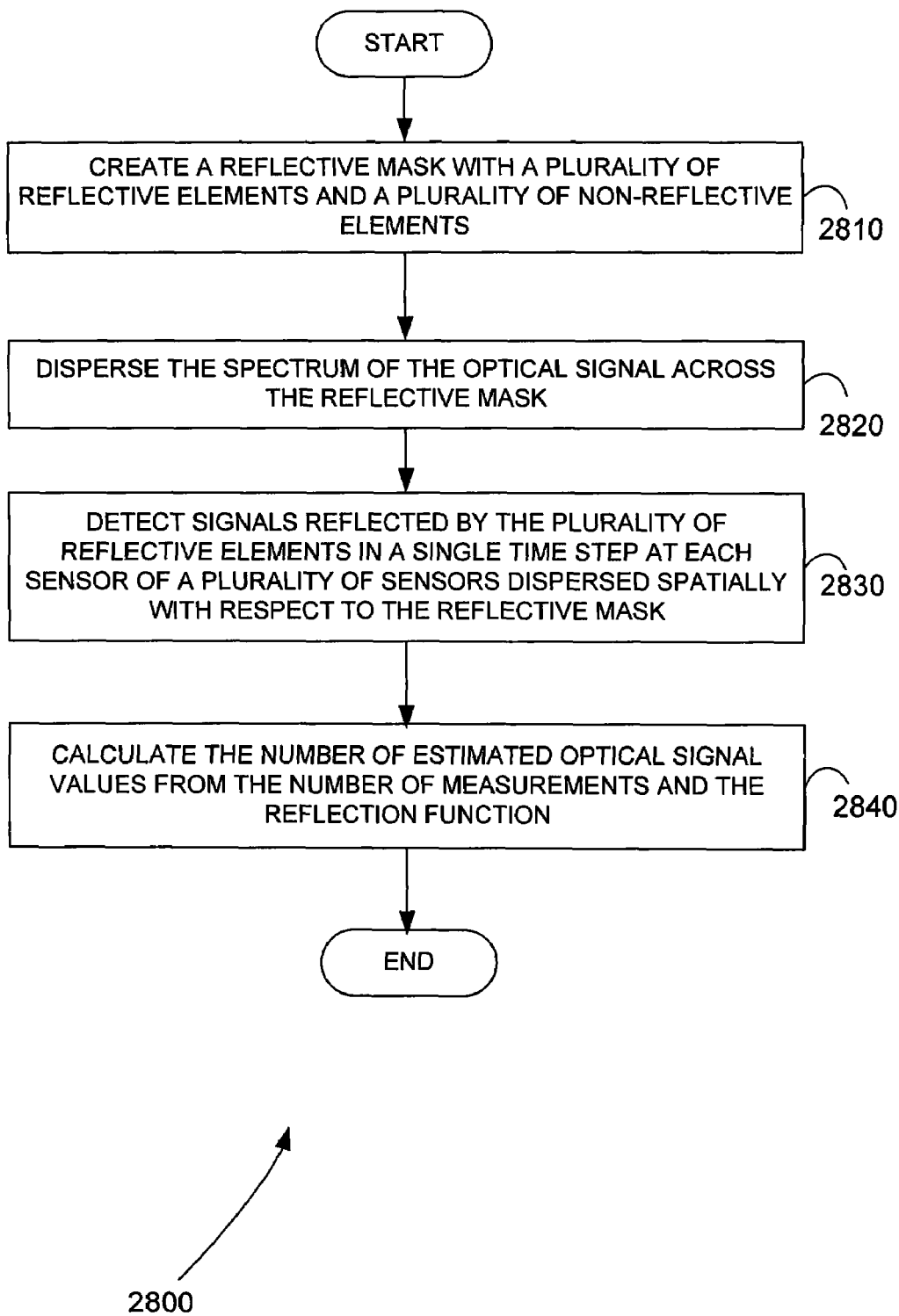
FIG. 28 is a flowchart showing an exemplary method for compressively sampling an optical signal using a reflective mask, in accordance with an embodiment of the present invention.

FIG. 28 is a flowchart showing an exemplary method 2800 for compressively sampling an optical signal using a reflective mask, in accordance with an embodiment of the present invention.

In step 2810 of method 2800, an reflective mask with a plurality of reflective elements and a plurality of non-reflective elements is created. The location of the plurality of reflective elements and the plurality of non-reflective elements is determined by a reflection function. The reflective mask includes but is not limited to a reflection mask or a coded aperture.

In step 2820, the spectrum of the optical signal is dispersed across the reflective mask.

In step 2830, signals reflected by the plurality of reflective elements are detected in a single time step at each sensor of a plurality of sensors dispersed spatially with respect to the reflective mask. Each sensor of the plurality of sensors produces a measurement resulting in a number of measurements for the single time step.

In step 2840, a number of estimated optical signal values is calculated from the number of measurements and the reflection function. The reflection function is selected so that the number of measurements is less than the number of estimated optical signal values.

In another embodiment of the present invention, the number of estimated optical signal values is calculated by multiplying the number of measurements by a pseudo-inverse of the reflection function. In another embodiment of the present invention, the number of estimated optical signal values is calculated by a linear constrained optimization procedure. In another embodiment of the present invention, the number of estimated optical signal values is calculated by a non-linear constrained optimization procedure. In another embodiment of the present invention, the reflective mask is adaptively or dynamically variable. In another embodiment of the present invention, the adaptively or dynamically variable reflective mask is based on electro-optic effects, liquid crystals, or micro mechanical devices. In another embodiment of the present invention, the reflective mask implements positive and respective negative elements of an encoding.

Figure 29:
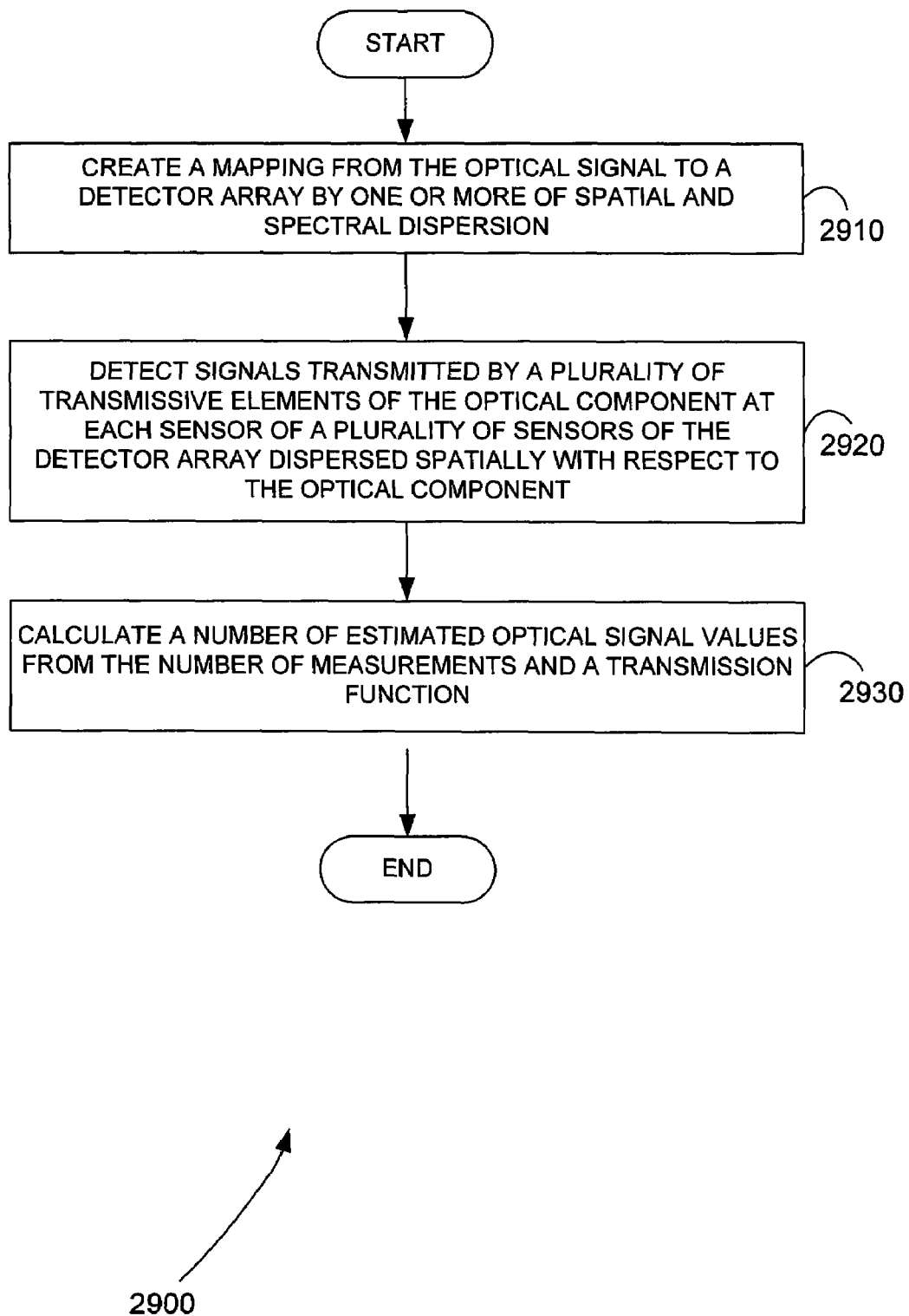
FIG. 29 is a flowchart showing an exemplary method for compressively sampling an optical signal using an optical component to encode multiplex measurements, in accordance with an embodiment of the present invention.

FIG. 29 is a flowchart showing an exemplary method 2900 for compressively sampling an optical signal using an optical component to encode multiplex measurements, in accordance with an embodiment of the present invention.

In step 2910 of method 2900, a mapping is created from the optical signal to a detector array by spatial and/or spectral dispersion.

In step 2920, signals transmitted are detected by a plurality of transmissive elements of the optical component at each sensor of a plurality of sensors of the detector array dispersed spatially with respect to the optical component. Each sensor of the plurality of sensors produces a measurement resulting in a number of measurements.

In step 2930, a number of estimated optical signal values is calculated from the number of measurements and a transmission function, wherein the transmission function is selected so that the number of measurements is less than the number of estimated optical signal values.

Another embodiment of the present invention is a spectrometer using compressive sampling. The spectrometer includes a plurality of optical components and a digital computer. The plurality of optical components measure multiple linear projections of a spectral signal. The digital computer performs decompressive inference on the multiple linear projections to produce a decompressed signal.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for compressively sampling an optical signal using multiplex sampling, comprising:
   using group measurement of multiple optical signal components on a plurality of single detectors such that less than one measurement per signal component is taken; and
   using probabilistic inference to produce a decompressed optical signal from the group measurement on a digital computer.

2. A method for compressively sampling an optical signal using an optical component to encode multiplex measurements comprising:
   creating a mapping from the optical signal to a detector array by one or more of spatial and spectral dispersion;
   detecting signals transmitted by a plurality of transmissive elements of the optical component at each sensor of a plurality of sensors of the detector array dispersed spatially with respect to the optical component; wherein the each sensor of a plurality of sensors produces a measurement resulting in a number of measurements; and
   calculating a number of estimated optical signal values from the number of measurements and a transmission function, wherein the transmission function is selected so that the number of measurements is less than the number of estimated optical signal values.

* * * * *